(12) United States Patent
Bourgeois et al.

(10) Patent No.: US 10,817,145 B1
(45) Date of Patent: Oct. 27, 2020

(54) SYSTEM AND METHOD FOR SEAMLESSLY INTEGRATING AN IFRAME INTO A WEBPAGE

(71) Applicant: Centergy Consulting, LLC, Harahan, LA (US)

(72) Inventors: Edward J. Bourgeois, River Ridge, LA (US); Gabriel DeRepentigny, Radford, VA (US)

(73) Assignee: Centergy Consulting, LLC, Harahan, LA (US)

( * ) Notice: Subject to any disclaimer, the term of this patent is extended or adjusted under 35 U.S.C. 154(b) by 0 days.

(21) Appl. No.: 16/182,109

(22) Filed: Nov. 6, 2018

(51) Int. Cl.
| | |
|---|---|
| *G06F 3/048* | (2013.01) |
| *G06F 3/0483* | (2013.01) |
| *G06F 9/455* | (2018.01) |
| *G06F 16/958* | (2019.01) |
| *G06F 16/9535* | (2019.01) |
| *G06F 16/955* | (2019.01) |

(Continued)

(52) U.S. Cl.
CPC ........ *G06F 3/0483* (2013.01); *G06F 9/45529* (2013.01); *G06F 16/9535* (2019.01); *G06F 16/9566* (2019.01); *G06F 16/9577* (2019.01); *G06F 16/986* (2019.01); *G06F 3/0485* (2013.01)

(58) Field of Classification Search
CPC .... G06F 16/951; G06F 16/953; G06F 16/955; G06F 16/986; G06F 3/0483; G06F 16/9566; G06F 16/9577; G06F 16/9535; G06F 9/45529; G06F 3/0485
See application file for complete search history.

(56) References Cited

U.S. PATENT DOCUMENTS

| | | | |
|---|---|---|---|
| 2006/0173743 A1* | 8/2006 | Bollay | G06Q 30/02 705/14.41 |
| 2010/0017289 A1* | 1/2010 | Sah | G06Q 30/02 705/14.49 |

(Continued)

OTHER PUBLICATIONS lAoun Lutfi et al., Towards Automated Optimization of Web Interfaces and Application to E-commerce, Sep. 1, 2017, IEEE Xplore, pp. 1-6 (Year: 2017).*

(Continued)

*Primary Examiner* — Tam T Tran
(74) *Attorney, Agent, or Firm* — AdamsIP, LLC; J. Hunter Adams; Edward Garner

(57) ABSTRACT

A system and method for seamlessly integrating an iframe into a webpage is provided. The system generally comprises a computing entity having a user interface, a processor operably connected to the computing entity via a network, and a non-transitory computer-readable medium having instructions stored thereon. A database may be operably connected to the processor and store iframe data within user profiles. The system also comprises an iframe management script having a plurality of modules that cause the processor to perform various functions. The iframe may be embedded within the parent-document by the iframe management script of the parent-document, wherein the iframe management script instructs the processor as to the sizing and position of the iframe within the parent-document. The iframe management script may also manage various features of the content within the iframe.

39 Claims, 11 Drawing Sheets

(51) Int. Cl.
*G06F 16/957* (2019.01)
*G06F 3/0485* (2013.01)

(56) References Cited

U.S. PATENT DOCUMENTS

| | | | | |
|---|---|---|---|---|
| 2012/0084641 | A1* | 4/2012 | Chung | G06Q 30/0241 |
| | | | | 715/240 |
| 2013/0167162 | A1* | 6/2013 | Fernandez | A63F 13/335 |
| | | | | 719/328 |
| 2014/0222911 | A1* | 8/2014 | Haugen | H04L 67/22 |
| | | | | 709/204 |
| 2015/0341347 | A1* | 11/2015 | Kong | H04L 63/08 |
| | | | | 726/4 |

OTHER PUBLICATIONS

Fu Jianming et al., An Emprical Study of Unsolicited Content Injection into a Website, Oct. 1, 2017, IEEE Xplore, pp. 104-111 (Year: 2017).*

* cited by examiner

SYSTEM AND METHOD FOR SEAMLESSLY INTEGRATING AN IFRAME INTO A WEBPAGE

FIELD OF THE DISCLOSURE

The subject matter of the present disclosure refers generally to a system and method for seamlessly integrating an iframe into a webpage.

BACKGROUND

Many business and other operating entities face online competition. Potential customers will quickly and easily go elsewhere online to get any services which are not provided on the operating entity's own website. In order to provide more services on their own website, it would be advantageous for businesses and other entities to employ the aid of third-party, white-labeled service providers. Unfortunately, it is difficult to embed a third-party, white-labeled service on your website seamlessly. The normal method of embedding a third-party system on a website is using an iframe, but this method is not seamless; that is, using an iframe normally introduces several inconveniences and difficulties for the end-user, as well as obvious visual cues indicating the content in the iframe is from a third-party.

For instance, Credit Unions share net returns with members in the form of better pricing on financial products, such as auto loans. However, the internet has caused a significant paradigm shift in how consumers research, buy, and finance vehicles. A typical consumer today will spend ten or more hours online researching prior to buying a vehicle. Consumers are bombarded with auto loan and finance options while performing this research, and many of these finance options come with instantaneous approval. Additionally, cookies from various automobile research sites are placed on the consumer's internet device, which further instructs banners on webpages how to gear their ads. As a result, the majority of auto loans are now made via the internet and at auto dealerships where the financing and auto protection products are not as consumer friendly as they would be at a Credit Union. In this way, the "for profit" companies prosper at the expense of the Credit Union and the consumer. Additionally, many Credit Unions are no longer competitive in the auto lending space and are succumbing to the paradigm shift. Instead, Credit Unions now buy auto loans from auto dealerships or internet auto lending companies. Though putting auto loans on its books makes the Credit Union balance sheets look good, it costs its member more money and doesn't allow the Credit Union to achieve its mission of enhancing the financial well-being of its members.

Therefore, there is a need in the art for a system and method that places all the typical auto research, buying, and financing tools seamlessly on the Credit Union's website and out of the view of the internet advertising companies such that the Credit Union may be competitive the auto lending market and achieve its mission of enhancing the financial well-being of its members.

SUMMARY

A system and method for seamlessly integrating an iframe into a webpage is provided. The system generally comprises a computing entity having a user interface, a processor operably connected to said computing entity via network, and a non-transitory computer-readable medium having instructions stored thereon. In one preferred embodiment, a database may be operably connected to the processor and store iframe data within user profiles. The instructions instruct the processor on how to manipulate a webpage having an iframe such that the i-document of the iframe is seamlessly integrated with the parent document. It is understood that the various method steps associated with the methods of the present disclosure may be carried out as operations by the system.

As defined herein, a webpage is an electronic document that contains information and is located at a particular location on a network. A user may access a webpage by inputting an address coinciding with a document's location within a user interface that allows the user to access webpages. In a preferred embodiment, a webpage comprises a parent-document having an iframe. The parent-document is the document encapsulated by the parent window of a user interface, wherein the parent-document may contain various types of information, including, but not limited to text, multimedia, etc. The iframe may be embedded within the parent-document by an iframe management script of the parent-document, wherein the iframe management script instructs the processor as to the sizing and position of the iframe within the parent-document. In some embodiments, the iframe management script may manage various features of the content within the iframe. An iframe may be defined as an inline frame used inside of a webpage that allows another document to be loaded within the parent-document. The document loaded within the iframe is an i-document.

The webpages may be stored on the non-transitory computer readable medium, and the iframe management script is stored within the parent-documents of the webpages. The iframe management script comprises a plurality of modules having instructions, which may be executed by the processor to perform the various tasks of the invention described herein. One preferred embodiment of the system may comprise a database operably connected to the processor. The database may be configured to store iframe data and personal data within user profiles. The database may also be configured to store website data. The iframe management script may contain instructions that when executed by the processor transmit the iframe data and personal data of a user to the database. The database is configured to store iframe data, personal data, and website data. The processor may be operably connected to the database via wired or wireless connection. The database may comprise a relational and/or object database and a server dedicated solely to managing the content assigned to user profiles in the manner disclosed herein.

The iframe management script is a program that is designed to manipulate a webpage in a way that causes an i-document within an iframe of a parent-document to appear as though it were part of the parent-document. The iframe management script is saved within the parent-document of a webpage, wherein loading the parent-document causes the iframe management script to be executed by the processor. In a preferred embodiment, the iframe management script comprises a plurality of modules that cause the processor to perform various functions. A module may be defined as a part of a software program that contains one or more routines. Programs may be composed of one or more independently developed modules that are not combined until the program is linked. Modules of the iframe management script may include, but are not limited to, a dynamic height adjustment module, seamless scrolling module, external link module, external form submission module, dynamic internal styling module, HTTP referer tracking module, Open Graphs module, first iframe linking module, second iframe linking module, JavaScript injection module, and mobile responsiveness module, or any combination thereof.

The dynamic height adjustment module is designed to change the height of the iframe such that the i-document within the iframe is fully displayed within the parent-document. This is accomplished by determining the height of the i-document within the iframe and then changing the height property of the iframe to match the height of the i-document. The seamless scrolling module is designed to cause scroll to top links within an i-document to execute a scroll to top function of the parent-document. This is accomplished by modifying the scroll to top link of the i-document in a way such that selection of the scroll to top link causes a communication between the i-document and the parent-document, wherein said communication causes the processor to execute a routine that when read by the processor causes a scroll to top function of the parent-document to execute. The external link module is designed to manipulate links within an i-document of an iframe to function as if they were part of the parent-document. This is accomplished by communicating a Uniform Resource Locator (URL) of a selected link of an i-document to the parent-document, wherein said communication causes the processor to execute a routine that changes the source of the iframe to the URL of the selected link. The external form submission module is designed to transform input of a form within the iframe into a form of the parent-document and then submit the newly created form from the parent window. This is accomplished by reading iframe data input into the i-document and then communicating that data to the parent-document, wherein communication of the iframe data to the parent-document causes the processor to execute a routine that copies the iframe data to a form and then submits that form.

The dynamic internal styling module is designed to determine the styling of the parent-document and replicate that styling on the i-document within the iframe. This is accomplished by determining the Cascading Style Sheets (CSS) style of the parent-document and modifying the CSS style of the i-document to match the parent-document. The HTTP referer tracking module is designed to communicate the referer header from the parent-document such that the server 110 hosting the i-document receives user information from the parent-document. This is accomplished by modifying the URL of the iframe to include a referer variable of the parent-document. The Open Graphs module is designed to assist social media sites create reasonable webpage previews for social media platforms. This is accomplished by determining whether a social media post has been made and then creating an alternate URL, wherein a modified page is created for the alternate URL and provided to the social media platform when the social media platform requests the URL. The first iframe linking module is designed to restore standard functionality of the address bar and link to pages within a website even though the Auto Link content is being served up through an iframe on a client site. This is accomplished by determining the pathname of the i-document within the iframe and manipulating the autolink variable using the pathname.

The second iframe linking module is also designed to restore standard functionality of the address bar and link to pages within a website even though the Auto Link content is being served up through an iframe on a parent-document. This is accomplished by modifying a URL of an iframe using the pathname of the autolink hash variable. The JavaScript injection module is designed to inject JavaScript code into webpages such that it resizes or moves around elements of the website as needed in order to fit an iframe. This is accomplished by checking a database for JavaScript code if it is determined that the website requires document modifications and then injecting that JavaScript code into the website if it is found a modified HTML code requesting such changes exists. The mobile responsiveness module is designed to manage webpages having an iframe on mobile devices. This is accomplished by querying a database having a plurality of mobile iframe management scripts linked to said webpage, wherein said database returns the mobile iframe management script to the processor when said webpage has an associated mobile iframe management script.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For instance, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For instance, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

As will be evident from the disclosure provided below, the present invention satisfies the need for a system and method capable of seamlessly integrating an iframe into a webpage, and thereby improving upon known systems currently employed within the art.

Figure 1:
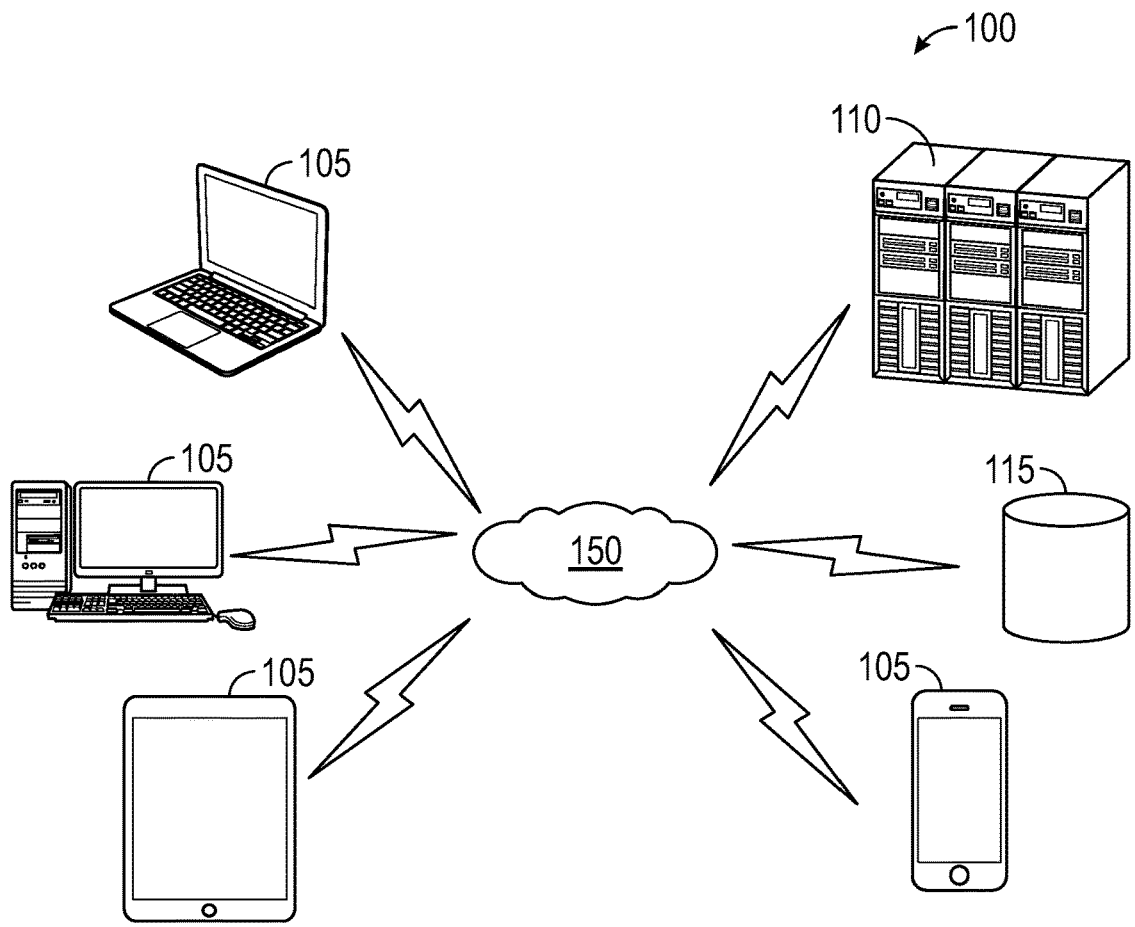
FIG. 1 is a diagram of an example environment in which techniques described herein may be implemented.

FIG. 1 depicts an exemplary environment 100 of the system 400 consisting of clients 105 connected to a server 110 and/or database 115 via a network 150. Clients 105 are devices of users 405 that may be used to access servers 110 and/or databases 115 through a network 150. A network 150 may comprise of one or more networks of any kind, including, but not limited to, a local area network (LAN), a wide area network (WAN), metropolitan area networks (MAN), a telephone network, such as the Public Switched Telephone Network (PSTN), an intranet, the Internet, a memory device, another type of network, or a combination of networks. In a preferred embodiment, computing entities 200 may act as clients 105 for a user 405. For instance, a client 105 may include a personal computer, a wireless telephone, a personal digital assistant (PDA), a laptop, a smart phone, a tablet computer, or another type of computation or communication device. Servers 110 may include devices that access, fetch, aggregate, process, search, provide, and/or maintain documents. Although FIG. 1 depicts a preferred embodiment of an environment 100 for the system 400, in other implementations, the environment 100 may contain fewer components, different components, differently arranged components, and/or additional components than those depicted in FIG. 1. Alternatively, or additionally, one or more components of the environment 100 may perform one or more other tasks described as being performed by one or more other components of the environment 100.

As depicted in FIG. 1, one embodiment of the system 400 may comprise a server 110. Although shown as a single server 110 in FIG. 1, a server 110 may, in some implementations, be implemented as multiple devices interlinked together via the network 150, wherein the devices may be distributed over a large geographic area and performing different functions or similar functions. For instance, two or more servers 110 may be implemented to work as a single server 110 performing the same tasks. Alternatively, one server 110 may perform the functions of multiple servers 110. For instance, a single server 110 may perform the tasks of a web server and an indexing server 110. Additionally, it is understood that multiple servers 110 may be used to operably connect the processor 220 to the database 115 and/or other content repositories. The processor 220 may be operably connected to the server 110 via wired or wireless connection. Types of servers 110 that may be used by the system 400 include, but are not limited to, search servers, document indexing servers, and web servers, or any combination thereof.

Search servers may include one or more computing entities 200 designed to implement a search engine, such as a documents/records search engine, general webpage search engine, etc. Search servers may, for example, include one or more web servers designed to receive search queries and/or inputs from users 405, search one or more databases 115 in response to the search queries and/or inputs, and provide documents or information, relevant to the search queries and/or inputs, to users 405. In some implementations, search servers may include a web search server that may provide webpages 1600 to users 405, wherein a provided webpage 1600 may include a reference to a web server at which the desired information and/or links are located. The references to the web server at which the desired information is located may be included in a frame and/or text box, or as a link to the desired information/document. Document indexing servers may include one or more devices designed to index documents available through networks 150. Document indexing servers may access other servers 110, such as web servers that host content, to index the content. In some implementations, document indexing servers may index documents/records stored by other servers 110 connected to the network 150. Document indexing servers may, for example, store and index content, information, and documents relating to user accounts and user-generated content. Web servers may include servers 110 that provide webpages 1600 to clients 105. For instance, the webpages 1600 may be HTML-based webpages. A web server may host one or more websites. As used herein, a website may refer to a collection of related webpages 1600. Frequently, a website may be associated with a single domain name, although some websites may potentially encompass more than one domain name. The concepts described herein may be applied on a per-website basis. Alternatively, in some implementations, the concepts described herein may be applied on a per-webpage 1600 basis.

As used herein, a database 115 refers to a set of related data and the way it is organized. Access to this data is usually provided by a database management system (DBMS) consisting of an integrated set of computer software that allows users 405 to interact with one or more databases 115 and provides access to all of the data contained in the database 115. The DBMS provides various functions that allow entry, storage and retrieval of large quantities of information and provides ways to manage how that information is organized. Because of the close relationship between the database 115 and the DBMS, as used herein, the term database 115 refers to both a database 115 and DBMS.

Figure 2:
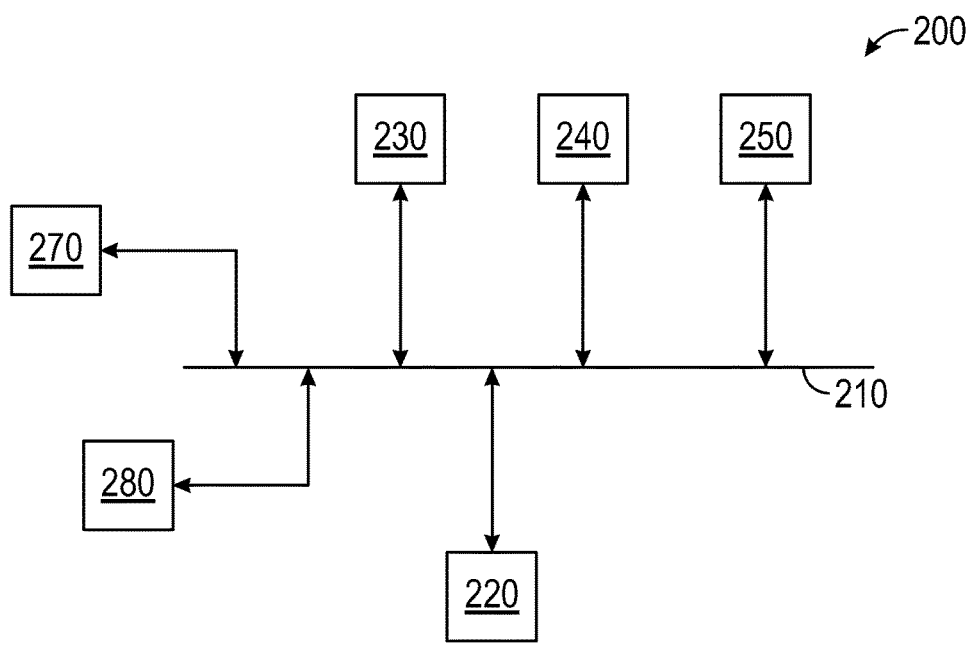
FIG. 2 is a diagram of an example environment in which techniques described herein may be implemented.

FIG. 2 is an exemplary diagram of a client 105, server 110, and/or or database 115 (hereinafter collectively referred to as "computing entity 200"), which may correspond to one or more of the clients 105, servers 110, and databases 115 according to an implementation consistent with the principles of the invention as described herein. The computing entity 200 may comprise a bus 210, a processor 220, memory 304, a storage device 250, a peripheral device 270, and a communication interface 280. The bus 210 may be defined as one or more conductors that permit communication among the components of the computing entity 200. The processor 220 may be defined as a logic circuitry that responds to and processes the basic instructions that drive the computing entity 200. Memory 304 may be defined as the integrated circuitry that stores information for immediate use in a computing entity 200. A peripheral device 270 may be defined as any hardware used by a user 405 and/or the computing entity 200 to facilitate communicate between the two. A storage device 250 may be defined as a device used to provide mass storage to a computing entity 200. A communication interface 280 may be defined as any transceiver-like device that enables the computing entity 200 to communicate with other devices and/or computing entities 200.

The bus 210 may comprise a high-speed interface 308 and/or a low-speed interface 312 that connects the various components together in a way such they may communicate with one another. A high-speed interface 308 manages bandwidth-intensive operations for computing device 300, while a low-speed interface 312 manages lower bandwidth-intensive operations. In some preferred embodiments, the high-speed interface 308 of a bus 210 may be coupled to the memory 304, display 316, and to high-speed expansion ports 310, which may accept various expansion cards such as a graphics processing unit (GPU). In other preferred embodiments, the low-speed interface 312 of a bus 210 may be coupled to a storage device 250 and low-speed expansion ports 314. The low-speed expansion ports 314 may include various communication ports, such as USB, Bluetooth, Ethernet, wireless Ethernet, etc. Additionally, the low-speed expansion ports 314 may be coupled to one or more peripheral devices 270, such as a keyboard, pointing device, scanner, and/or a networking device, wherein the low-speed expansion ports 314 facilitate the transfer of input data from the peripheral devices 270 to the processor 220 via the low-speed interface 312.

The processor 220 may comprise any type of conventional processor or microprocessor that interprets and executes computer readable instructions. The processor 220 is configured to perform the operations disclosed herein based on instructions stored within the system 400. The processor 220 may process instructions for execution within the computing entity 200, including instructions stored in memory 304 or on a storage device 250, to display graphical information for a graphical user interface (GUI) on an external peripheral device 270, such as a display 316. The processor 220 may provide for coordination of the other components of a computing entity 200, such as control of user interfaces 410, applications run by a computing entity 200, and wireless communication by a communication device of the computing entity 200. The processor 220 may be any processor or microprocessor suitable for executing instructions. In some embodiments, the processor 220 may have a memory device therein or coupled thereto suitable for storing the data, content, or other information or material disclosed herein. In some instances, the processor 220 may be a component of a larger computing entity 200. A computing entity 200 that may house the processor 220 therein may include, but are not limited to, laptops, desktops, workstations, personal digital assistants, servers, mainframes, cellular telephones, tablet computers, or any other similar device. Accordingly, the inventive subject matter disclosed herein, in full or in part, may be implemented or utilized in devices including, but are not limited to, laptops, desktops, workstations, personal digital assistants, servers, mainframes, cellular telephones, tablet computers, or any other similar device.

Memory 304 stores information within computing device 300. In some preferred embodiments, memory 304 may include one or more volatile memory units. In another preferred embodiment, memory 304 may include one or more non-volatile memory units. Memory 304 may also include another form of computer-readable medium, such as a magnetic or optical disk. For instance, a portion of a magnetic hard drive may be partitioned as a dynamic scratch space to allow for temporary storage of information that may be used by the processor 220 when faster types of memory, such as random-access memory (RAM), are in high demand. A computer-readable medium may refer to a non-transitory computer-readable memory device. A memory device may refer to storage space within a single storage device 250 or spread across multiple storage devices 250. The memory 304 may comprise main memory 230 and/or read only memory (ROM) 240. In a preferred embodiment, the main memory 230 may comprise RAM or another type of dynamic storage device 250 that stores information and instructions for execution by the processor 220. ROM 240 may comprise a conventional ROM device or another type of static storage device 250 that stores static information and instructions for use by processor 220. The storage device 250 may comprise a magnetic and/or optical recording medium and its corresponding drive.

As mentioned earlier, a peripheral device 270 is a device that facilitates communication between a user 405 and the processor 220. The peripheral device 270 may include, but is not limited to, an input device and/or an output device. As used herein, an input device may be defined as a device that allows a user 405 to input data and instructions that is then converted into a pattern of electrical signals in binary code that are comprehensible to a computing entity 200. An input device of the peripheral device 270 may include one or more conventional devices that permit a user 405 to input information into the computing entity 200, such as a scanner, phone, camera, scanning device, keyboard, a mouse, a pen, voice recognition and/or biometric mechanisms, etc. As used herein, an output device may be defined as a device that translates the electronic signals received from a computing entity 200 into a form intelligible to the user 405. An output device of the peripheral device 270 may include one or more conventional devices that output information to a user 405, including a display 316, a printer, a speaker, an alarm, a projector, etc. Additionally, storage devices 250, such as CD-ROM drives, and other computing entities 200 may act as a peripheral device 270 that may act independently from the operably connected computing entity 200. For instance, a fitness tracker may transfer data to a smartphone, wherein the smartphone may use that data in a manner separate from the fitness tracker.

The storage device 250 is capable of providing the computing entity 200 mass storage. In some embodiments, the storage device 250 may comprise a computer-readable medium such as the memory 304, storage device 250, or memory 304 on the processor 220. A computer-readable medium may be defined as one or more physical or logical memory devices and/or carrier waves. Devices that may act as a computer readable medium include, but are not limited to, a hard disk device, optical disk device, tape device, flash memory or other similar solid-state memory device, or an array of devices, including devices in a storage area network or other configurations. Examples of computer-readable mediums include, but are not limited to, magnetic media such as hard disks, floppy disks, and magnetic tape; optical media such as CD ROM discs and DVDs; magneto-optical media such as optical discs; and hardware devices that are specially configured to store and perform programming instructions, such as ROM 240, RAM, flash memory, and the like.

In an embodiment, a computer program may be tangibly embodied in the storage device 250. The computer program may contain instructions that, when executed by the processor 220, performs one or more steps that comprise a method, such as those methods described herein. The instructions within a computer program may be carried to the processor 220 via the bus 210. Alternatively, the computer program may be carried to a computer-readable medium, wherein the information may then be accessed from the computer-readable medium by the processor 220 via the bus 210 as needed. In a preferred embodiment, the software instructions may be read into memory 304 from another computer-readable medium, such as data storage device 250, or from another device via the communication interface 280. Alternatively, hardwired circuitry may be used in place of or in combination with software instructions to implement processes consistent with the principles as described herein. Thus, implementations consistent with the invention as described herein are not limited to any specific combination of hardware circuitry and software.

Figure 3:
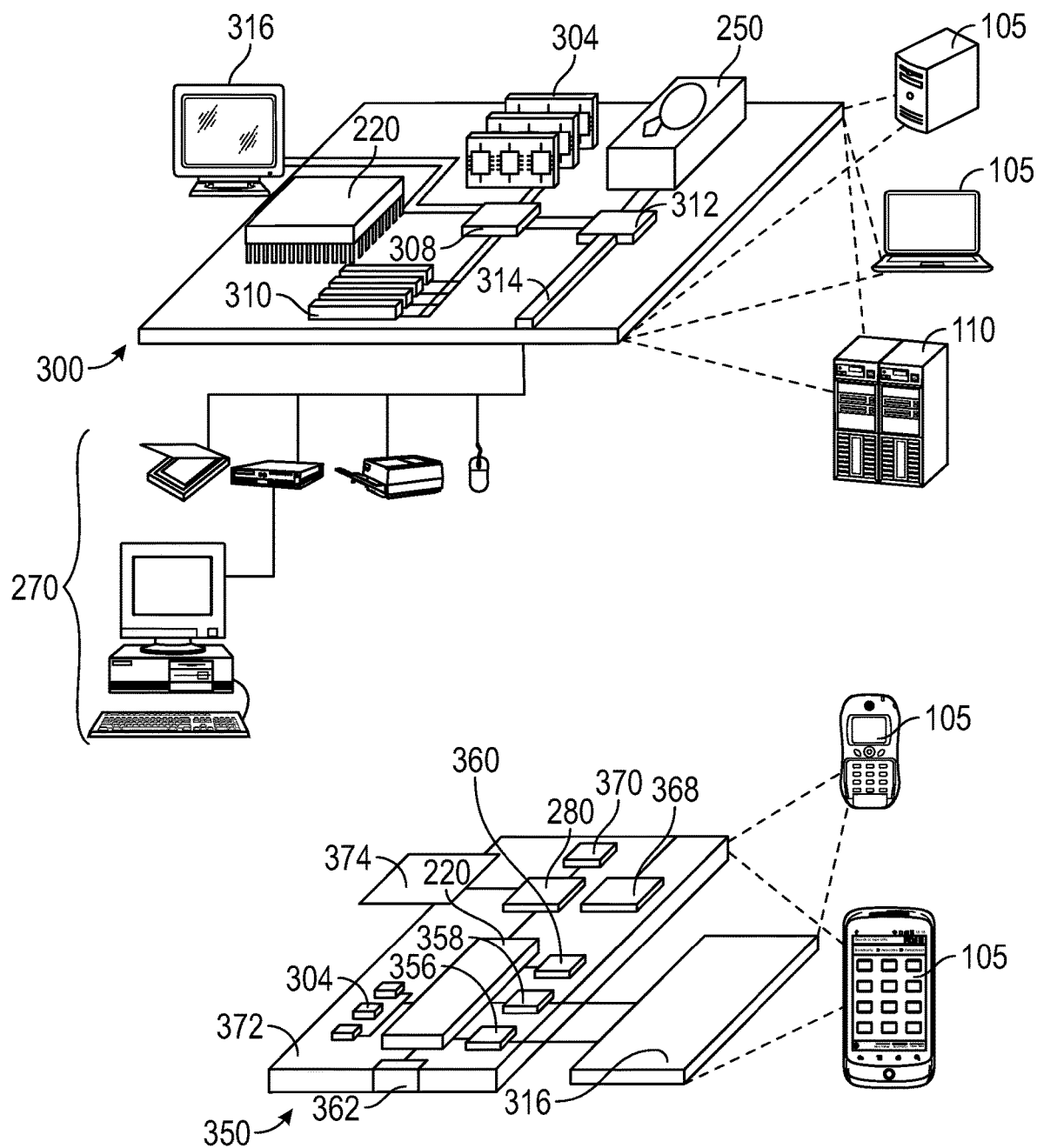
FIG. 3 is a diagram of an example environment in which techniques described herein may be implemented.

FIG. 3 depicts exemplary computing entities 200 in the form of a computing device 300 and mobile computing device 350, which may be used to carry out the various embodiments of the invention as described herein. A computing device 300 is intended to represent various forms of digital computers, such as laptops, desktops, workstations, servers, databases, mainframes, and other appropriate computers. A mobile computing device 350 is intended to represent various forms of mobile devices, such as scanners, scanning devices, personal digital assistants, cellular telephones, smart phones, tablet computers, and other similar devices. The various components depicted in FIG. 3, as well as their connections, relationships, and functions are meant to be examples only, and are not meant to limit the implementations of the invention as described herein. The computing device 300 may be implemented in a number of different forms, as shown in FIGS. 1 and 3. For instance, a computing device 300 may be implemented as a server 110 or in a group of servers 110. Computing devices 300 may also be implemented as part of a rack server system. In addition, a computing device 300 may be implemented as a personal computer, such as a desktop computer or laptop computer. Alternatively, components from a computing device 300 may be combined with other components in a mobile device, thus creating a mobile computing device 350.

Each mobile computing device 350 may contain one or more computing devices 300 and mobile devices, and an entire system may be made up of multiple computing devices 300 and mobile devices communicating with each other as depicted by the mobile computing device 350 in FIG. 3. The computing entities 200 consistent with the principles of the invention as disclosed herein may perform certain receiving, communicating, generating, output providing, correlating, and storing operations as needed to perform the various methods as described in greater detail below.

In the embodiment depicted in FIG. 3, a computing device 300 may include a processor 220, memory 304 a storage device 250, high-speed expansion ports 310, low-speed expansion ports 314, and bus 210 operably connecting the processor 220, memory 304, storage device 250, high-speed expansion ports 310, and low-speed expansion ports 314. In one preferred embodiment, the bus 210 may comprise a high-speed interface 308 connecting the processor 220 to the memory 304 and high-speed expansion ports 310 as well as a low-speed interface 312 connecting to the low-speed expansion ports 314 and the storage device 250. Because each of the components are interconnected using the bus 210, they may be mounted on a common motherboard as depicted in FIG. 3 or in other manners as appropriate. The processor 220 may process instructions for execution within the computing device 300, including instructions stored in memory 304 or on the storage device 250. Processing these instructions may cause the computing device 300 to display graphical information for a GUI on an output device, such as a display 316 coupled to the high-speed interface 308. In other implementations, multiple processors and/or multiple buses may be used, as appropriate, along with multiple memory units and/or multiple types of memory. Additionally, multiple computing devices may be connected, wherein each device provides portions of the necessary operations.

A mobile computing device 350 may include a processor 220, memory 304 a peripheral device 270 (such as a display 316, a communication interface 280, and a transceiver 368, among other components). A mobile computing device 350 may also be provided with a storage device 250, such as a micro-drive or other previously mentioned storage device 250, to provide additional storage. Preferably, each of the components of the mobile computing device 350 are interconnected using a bus 210, which may allow several of the components of the mobile computing device 350 to be mounted on a common motherboard as depicted in FIG. 3 or in other manners as appropriate. In some implementations, a computer program may be tangibly embodied in an information carrier. The computer program may contain instructions that, when executed by the processor 220, perform one or more methods, such as those described herein. The information carrier is preferably a computer-readable medium, such as memory, expansion memory 374, or memory 304 on the processor 220 such as ROM 240, that may be received via the transceiver or external interface 362. The mobile computing device 350 may be implemented in a number of different forms, as shown in FIG. 3. For example, a mobile computing device 350 may be implemented as a cellular telephone, part of a smart phone, personal digital assistant, or other similar mobile device.

The processor 220 may execute instructions within the mobile computing device 350, including instructions stored in the memory 304 and/or storage device 250. The processor 220 may be implemented as a chipset of chips that may include separate and multiple analog and/or digital processors. The processor 220 may provide for coordination of the other components of the mobile computing device 350, such as control of the user interfaces 410, applications run by the mobile computing device 350, and wireless communication by the mobile computing device 350. The processor 220 of the mobile computing device 350 may communicate with a user 405 through the control interface 358 coupled to a peripheral device 270 and the display interface 356 coupled to a display 316. The display 316 of the mobile computing device 350 may include, but is not limited to, Liquid Crystal Display (LCD), Light Emitting Diode (LED) display, Organic Light Emitting Diode (OLED) display, and Plasma Display Panel (PDP), or any combination thereof. The display interface 356 may include appropriate circuitry for causing the display 316 to present graphical and other information to a user 405. The control interface 358 may receive commands from a user 405 via a peripheral device 270 and convert the commands into a computer readable signal for the processor 220. In addition, an external interface 362 may be provided in communication with processor 220, which may enable near area communication of the mobile computing device 350 with other devices. The external interface 362 may provide for wired communications in some implementations or wireless communication in other implementations. In a preferred embodiment, multiple interfaces may be used in a single mobile computing device 350 as is depicted in FIG. 3.

Memory 304 stores information within the mobile computing device 350. Devices that may act as memory 304 for the mobile computing device 350 include, but are not limited to computer-readable media, volatile memory, and non-volatile memory. Expansion memory 374 may also be provided and connected to the mobile computing device 350 through an expansion interface 372, which may include a Single In-Line Memory Module (SIM) card interface or micro secure digital (Micro-SD) card interface. Expansion memory 374 may include, but is not limited to, various types of flash memory and non-volatile random-access memory (NVRAM). Such expansion memory 374 may provide extra storage space for the mobile computing device 350. In addition, expansion memory 374 may store computer programs or other information that may be used by the mobile computing device 350. For instance, expansion memory 374 may have instructions stored thereon that, when carried out by the processor 220, cause the mobile computing device 350 perform the methods described herein. Further, expansion memory 374 may have secure information stored thereon; therefore, expansion memory 374 may be provided as a security module for a mobile computing device 350, wherein the security module may be programmed with instructions that permit secure use of a mobile computing device 350. In addition, expansion memory 374 having secure applications and secure information stored thereon may allow a user 405 to place identifying information on the expansion memory 374 via the mobile computing device 350 in a non-hackable manner.

A mobile computing device 350 may communicate wirelessly through the communication interface 280, which may include digital signal processing circuitry where necessary. The communication interface 280 may provide for communications under various modes or protocols, including, but not limited to, Global System Mobile Communication (GSM), Short Message Services (SMS), Enterprise Messaging System (EMS), Multimedia Messaging Service (MMS), Code Division Multiple Access (CDMA), Time Division Multiple Access (TDMA), Personal Digital Cellular (PDC), Wideband Code Division Multiple Access (WCDMA), IMT Multi-Carrier (CDMAX 0), and General Packet Radio Service (GPRS), or any combination thereof. Such communication may occur, for example, through a transceiver 368. Short-range communication may occur, such as using a Bluetooth, WIFI, or other such transceiver 368. In addition, a Global Positioning System (GPS) receiver module 370 may provide additional navigation-and location-related wireless data to the mobile computing device 350, which may be used as appropriate by applications running on the mobile computing device 350. Alternatively, the mobile computing device 350 may communicate audibly using an audio codec 360, which may receive spoken information from a user 405 and covert the received spoken information into a digital form that may be processed by the processor 220. The audio codec 360 may likewise generate audible sound for a user 405, such as through a speaker, e.g., in a handset of mobile computing device 350. Such sound may include sound from voice telephone calls, recorded sound such as voice messages, music files, etc. Sound may also include sound generated by applications operating on the mobile computing device 350.

The system 400 may also comprise a power supply. The power supply may be any source of power that provides the system 400 with power. In an embodiment, the power supply may be a stationary power outlet. The system 400 may comprise of multiple power supplies that may provide power to the system 400 in different circumstances. For instance, the system 400 may be directly plugged into a stationary power outlet, which may provide power to the system 400 so long as it remains in one place. However, the system 400 may also be connected to a backup battery so that the system 400 may receive power even when the it is not connected to a stationary power outlet or if the stationary power outlet ceases to provide power to the computing entity 200.

Figure 4:
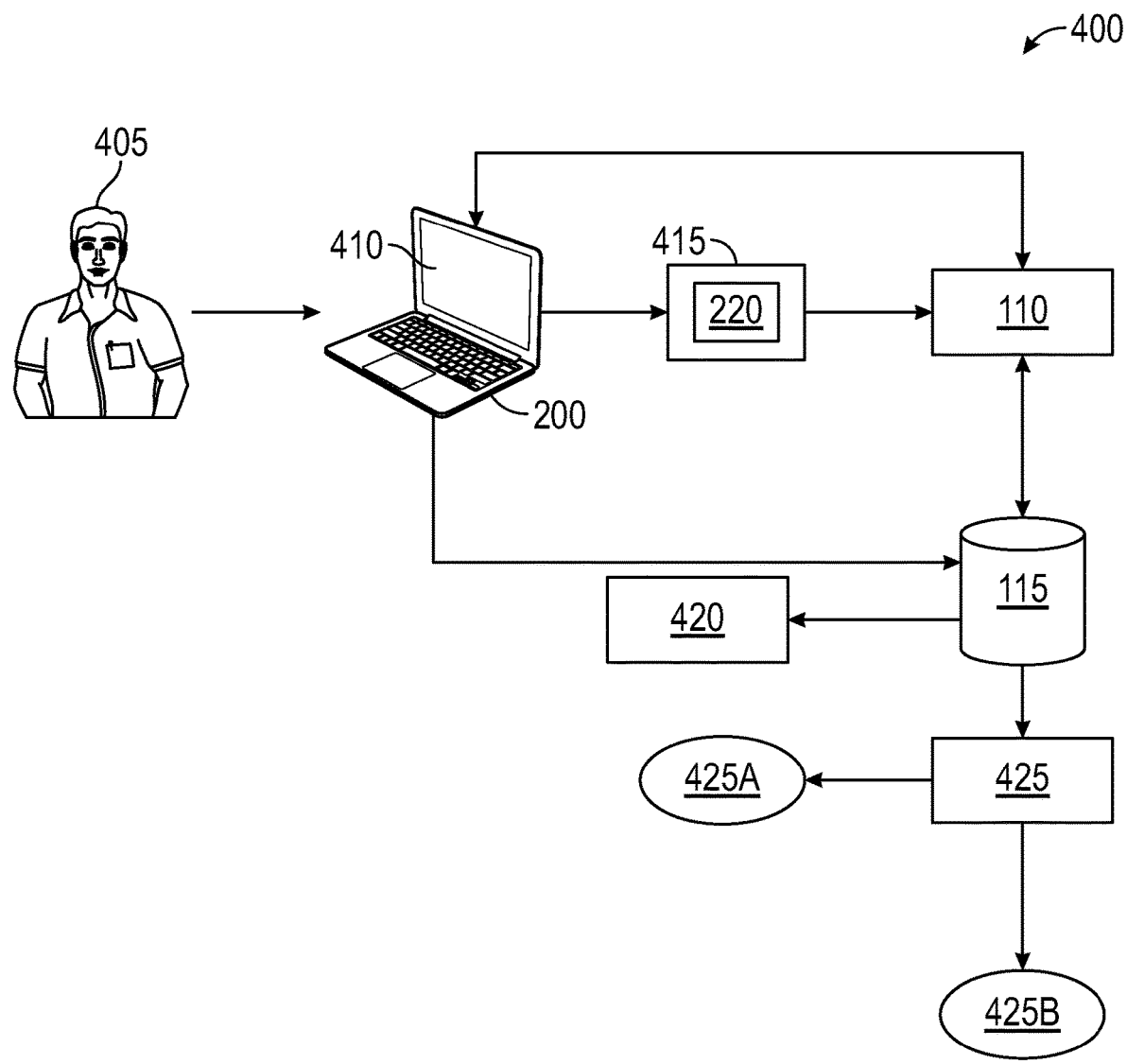
FIG. 4 is a diagram of an example environment in which techniques described herein may be implemented.
Figure 14:
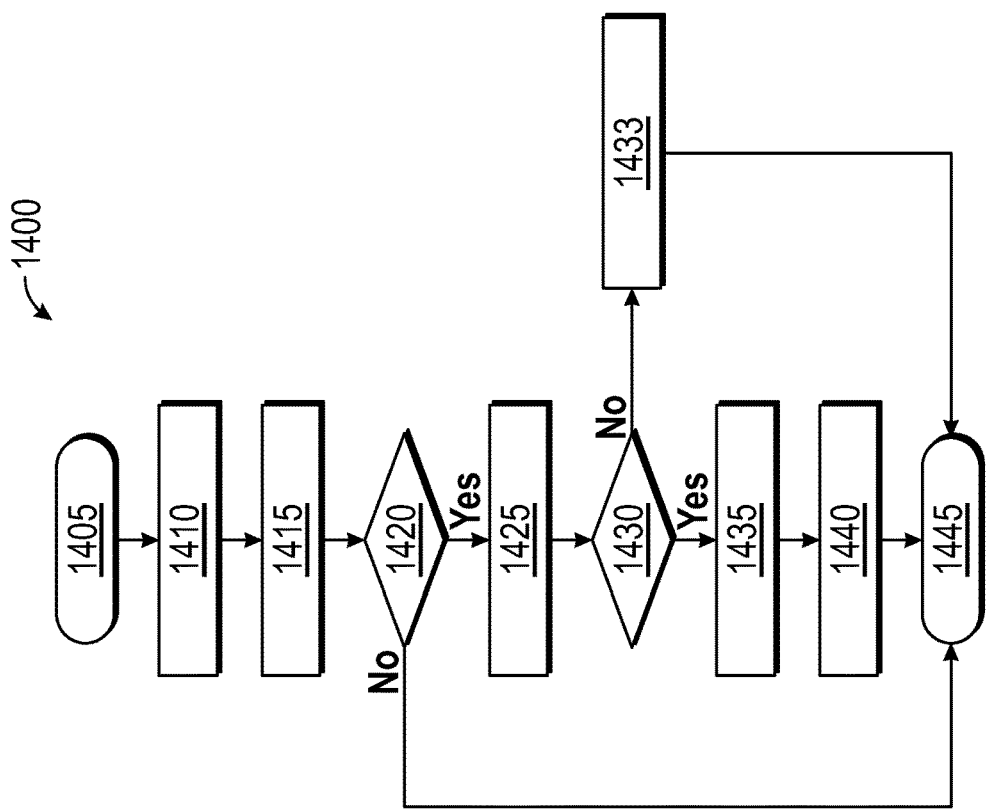
FIG. 14 is a flow chart illustrating certain method steps of a method embodying features consistent with the principles of the present disclosure.
Figure 15:
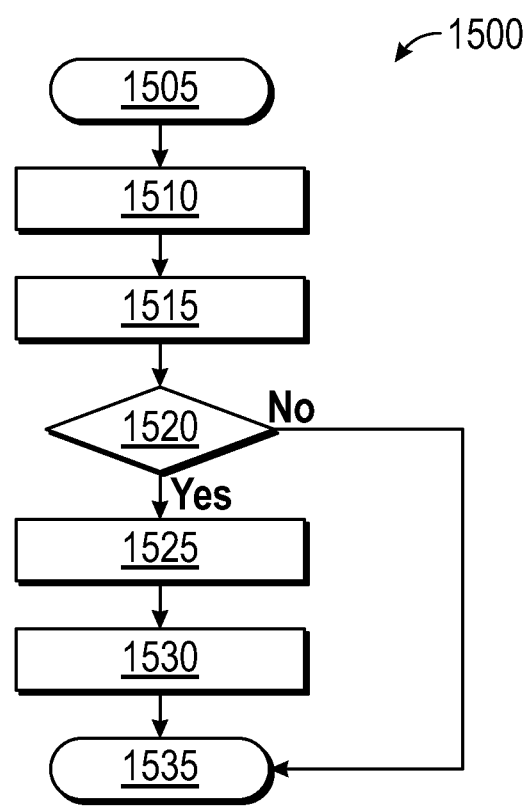
FIG. 15 is a flow chart illustrating certain method steps of a method embodying features consistent with the principles of the present disclosure.
Figure 16:
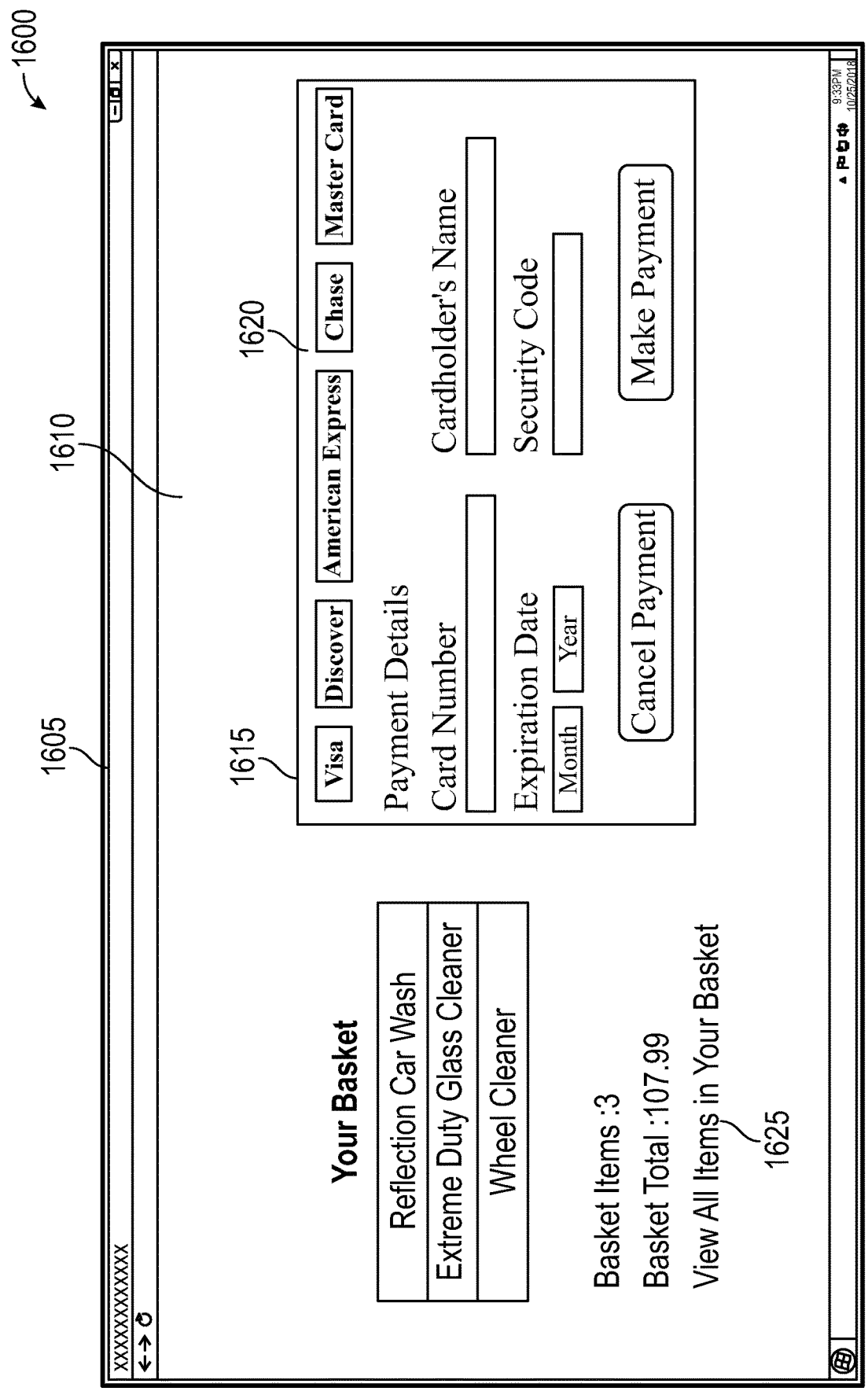
FIG. 16 is an example website in which an iframe may be embedded.
Figure 17:
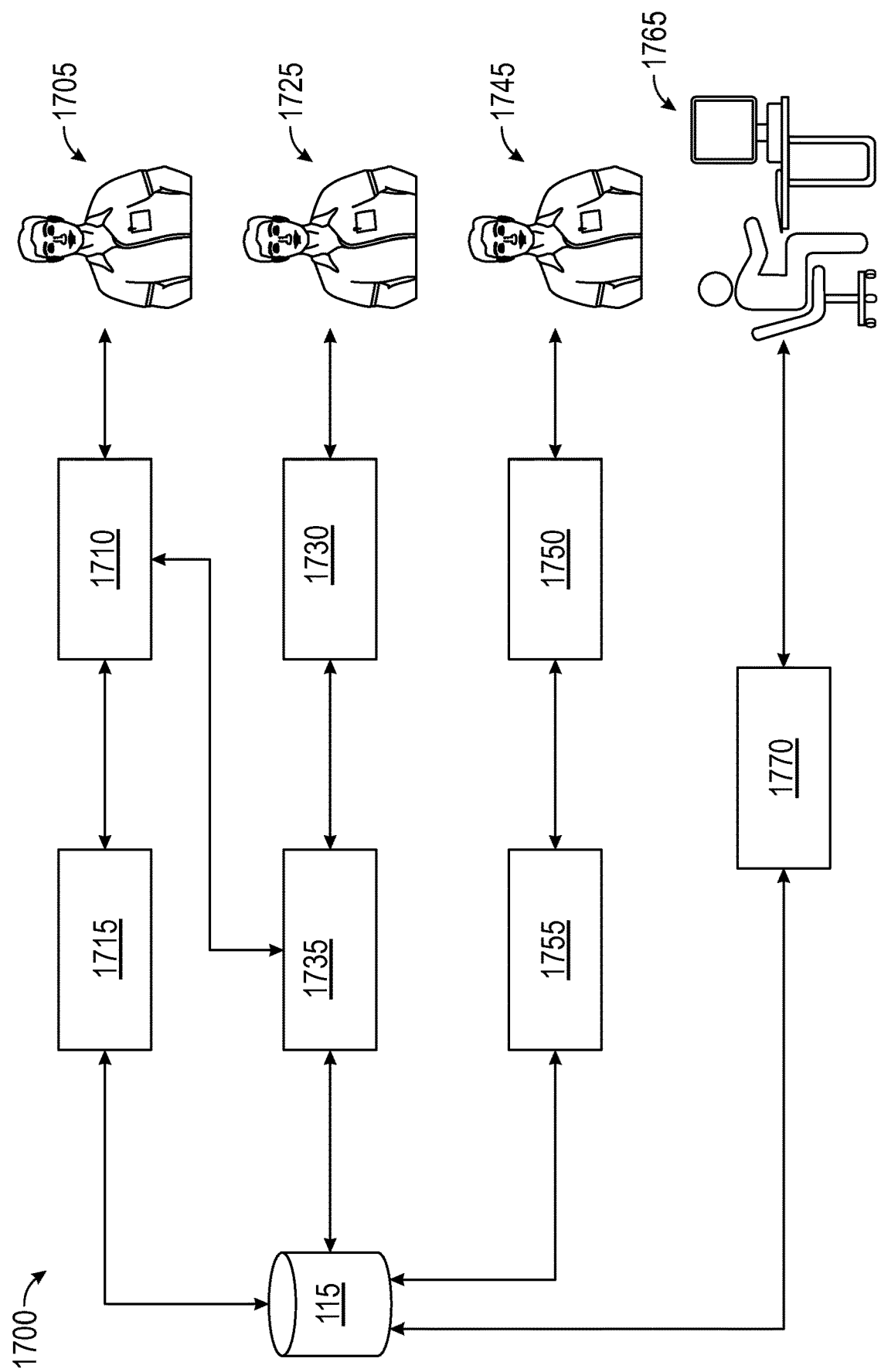
FIG. 17 is a diagram illustrating the manner in which individual access to data may be granted or limited based on user or system roles.

FIGS. 4-17 illustrate embodiments of a system 400 and method for seamlessly integrating an iframe 1615 into a webpage 1600. As illustrated in FIG. 4, the system 400 generally comprises a computing entity 200 having a user interface 410, a processor 220 operably connected to said computing entity 200 via network 150, and a non-transitory computer-readable medium 415 having instructions stored thereon. In one preferred embodiment, a database 115 may be operably connected to the processor 220 and store iframe data 425A and personal data 425B within user profiles 425. The database 115 may also be used to store various types of website data 420, such as text blocks containing JavaScript code or font styles. It is understood that the various method steps associated with the methods of the present disclosure may be carried out as operations by the system 400 shown in FIG. 4. FIGS. 5-15 illustrate various methods that may be carried out by the system 400. FIG. 16 illustrates an example webpage 1600 having an iframe 1615 embedded within the parent-document 1610, wherein the iframe 1615 is manipulated by the iframe management script to make the parent-document 1610 and i-document 1620 within the iframe 1615 seem seamless. FIG. 17 illustrates permission levels 1700 that may be utilized by the present system 400 for controlling access to user content 1715, 1735, 1755 such as iframe data 425A and personal data 425B.

As defined herein, a webpage 1600 is an electronic document that contains information and is located at a particular location on a network 150. A user 405 may access the document by inputting an address coinciding with a document's location within a user interface 410 that allows the user 405 to access webpages 1600. In a preferred embodiment as illustrated in FIG. 16, a webpage 1600 comprises a parent-document 1610 having an iframe 1615. The parent-document 1610 is the document encapsulated by the parent window 1605 of a user interface 410, wherein the parent-document 1610 may contain various types of information, including, but not limited to text, multimedia, etc. The iframe 1615 may be embedded within the parent-document 1610 by an iframe management script of the parent-document 1610, wherein the iframe management script instructs the processor 220 as to the sizing and position of the iframe 1615 within the parent-document 1610. In some embodiments, the iframe management script may manage various features of the content within the iframe 1615. An iframe 1615 may be defined as an inline frame used inside of a webpage 1600 that allows another document to be loaded within the parent-document 1610. The document loaded within the iframe 1615 is an i-document 1620.

The webpages 1600 may be stored on the non-transitory computer-readable medium 415, and the iframe management script may be stored within the parent-documents 1610 of the webpages 1600. The iframe management script comprises a plurality of modules, which may be executed by the processor 220 to perform the various tasks of the invention described herein. For instance, a dynamic height adjustment module of the iframe management script may provide instructions to the processor 220 that cause the processor 220 to automatically adjust the height and width of the iframe 1615 within the parent-document 1610 depending on the size of the i-document 1620 being sourced. For instance, a seamless scrolling module of the iframe management script may provide instructions to the processor 220 that cause the processor 220 to execute a scroll to top function of a parent-document 1610 when a scroll to top link is selected within an i-document 1620. For instance, an external link module of the iframe management script may provide instructions to the processor 220 that cause links 1625 within an i-document 1620 of an iframe 1615 to function as if they were part of the parent-document 1610. For instance, an external form submission module of the iframe management script may provide instructions to the processor 220 that cause the processor 220 to transform input of a form within the iframe 1615 into a form of the parent-document 1610 and then submit the newly created form from the parent window 1605. For instance, a dynamic internal styling module of the iframe management script may provide instructions to the processor 220 that cause the processor 220 to automatically adjust the font stylings of the i-document 1620 within the iframe 1615 such that they match the font stylings of the parent-document 1610.

One preferred embodiment of the system 400 may comprise a database 115 operably connected to the processor 220. The database 115 may be configured to store iframe data 425A and personal data 425B within user profiles 425. Iframe data 425A may be defined as commands input by a user 405 into the i-document 1620 within the iframe 1615. Personal data 425B may be defined as personal information of a user 405 such as gender, social security number, and age. The database may also be configured to store website data 420. Website data 420 may be defined as information relevant to a particular website, including, but not limited to, JavaScript code, HTML code, text data, picture data, etc. In a preferred embodiment, a user profile 425 is related to a particular user 405, but in other embodiments, a user profile 425 may relate to multiple users 405 possessing similar characteristics. A user 405 is preferably associated with a particular user profile 425 based on an IP address. However, it is understood that a user 405 may be associated with a user profile 425 using a variety of methods without departing from the inventive subject matter herein.

The iframe management script may contain instructions that when executed by the processor 220 transmit the iframe data 425A and personal data 425B of a user 405 to the database 115. As shown in FIG. 4, the database 115 is configured to store iframe data 425A, personal data 425B, and website data 420. The processor 220 may be operably connected to the database 115 via wired or wireless connection. The database 115 may be a relational database such that the iframe data 425A and personal data 425B associated with each user profile 425 within the plurality of user profiles 425 may be stored, at least in part, in one or more tables. Alternatively, the database 115 may be an object database such that the iframe data 425A and personal data 425B associated with each user profile 425 within the plurality of user profiles 425 are stored, at least in part, as objects. As depicted in FIG. 4, the database 115 may comprise a relational and/or object database and a server 110 dedicated solely to managing the content assigned to user profiles 425 in the manner disclosed herein.

The iframe management script is a program that is designed to manipulate a webpage 1600 in a way that causes an i-document 1620 within an iframe 1615 of a parent-document 1610 to appear as though it were part of the parent-document 1610. The iframe management script is saved within the parent-document 1610 of a webpage 1600, wherein loading the parent-document 1610 causes the iframe management script to be executed by the processor 220. In a preferred embodiment, the iframe management script comprises a plurality of modules that cause the processor 220 to perform various functions. A module may be defined as a part of a software program that contains one or more routines. Programs may be composed of one or more independently developed modules that are not combined until the program is linked. Modules of the iframe management script may include, but are not limited to, a dynamic height adjustment module, seamless scrolling module, external link module, external form submission module, dynamic internal styling module, HTTP referer tracking module, Open Graphs module, first iframe linking module, second iframe linking module, JavaScript injection module, and mobile responsiveness module, or any combination thereof. In a preferred embodiment, in order to allow communication between the iframe management script and the i-document of the iframe, the window.postMessage( ) function of the user interface 410 is utilized. The window.post-Message( ) function (from here on out referred to as "message function") allows communication between window objects that would normally be prohibited from communicating, such as the parent document and the iframe within it. In order for the message function to allow communication, instructions in both the outer document and the inner iframe must be written to explicitly authorize the other side to receive the communication. By controlling both the iframe management script of the parent document and the contents of the iframe, the code needed to authorize the communication and subsequent transfer of data from the i-document to the iframe management script may be deployed.

The dynamic height adjustment module is designed to change the height of the iframe 1615 such that the i-document 1620 within the iframe 1615 is fully displayed within the parent-document 1610. This is accomplished by determining the height of the i-document 1620 within the iframe 1615 and then changing the height property of the iframe 1615 to match the height of the i-document 1620. The seamless scrolling module is designed to cause scroll to top links within an i-document 1620 to execute a scroll to top function of the parent-document 1610. This is accomplished by modifying the scroll to top link of the i-document 1620 in a way such that selection of the scroll to top link causes a communication between the i-document 1620 and the parent-document 1610, wherein said communication causes the processor 220 to execute a routine that when read by the processor 220 causes a scroll to top function of the parent-document 1610 to execute. The external link module is designed to change the i-document 1620 based on a selection of a link within the iframe 1615 without the need to reload the webpage 1600. This is accomplished by communicating a Uniform Resource Locator (URL) of a selected link of an i-document 1620 to the parent-document 1610, wherein said communication causes the processor 220 to execute a routine that changes the source of the iframe 1615 to the URL of the selected link. The external form submission module is designed to replicate input in a form of the iframe 1615 into a form of the parent window 1605 and then submit that parent form. This is accomplished by reading iframe data 425A input into the i-document 1620 and then communicating that data to the parent-document 1610, wherein communication of the iframe data 425A to the parent-document 1610 causes the processor 220 to execute a routine that copies the iframe data 425A to a form and then submits that form.

The dynamic internal styling module is designed to determine the styling of the parent-document 1610 and replicate that styling on the i-document 1620 within the iframe 1615. This is accomplished by determining the CSS style of the parent-document 1610 and modifying the CSS style of the i-document 1620 to match the parent-document 1610. The HTTP referer tracking module is designed to communicate the referer header from the parent-document 1610 such that the server 110 hosting the i-document 1620 receives user information from the parent-document 1610. This is accomplished by modifying the URL of the iframe 1615 to include a referer variable from the parent-document 1610. The Open Graphs module is designed to assist social media sites create reasonable previews for social media platforms. This is accomplished by determining whether a social media post has been made and then creating an alternate URL, wherein a modified page is created for the alternate URL and provided to the social media platform when the social media platform requests the URL. The first iframe linking module is designed to restore standard functionality of the address bar and link to pages within a website even though the Auto Link content is being served up through an iframe 1615 on a client site. This is accomplished by determining the pathname of the i-document 1620 within the iframe 1615 and manipulating the autolink variable using the pathname.

The second iframe linking module is also designed to restore standard functionality of the address bar and link to pages within a website even though the Auto Link content is being served up through an iframe 1615 on a client site. This is accomplished by modifying a URL of an iframe using the pathname of the autolink hash variable. The JavaScript injection module is designed to inject JavaScript code into webpages 1600 such that it resizes or moves around elements of the webpage 1600 as needed in order to fit an iframe 1615. This is accomplished by checking a database for JavaScript code if it is determined that the website requires document modifications and then injecting that JavaScript code into the website if it is found a modified HTML code requesting such changes exists. The mobile responsiveness module is designed to manage webpages 1600 having an iframe 1615 on mobile devices. This is accomplished by querying a database 115 having a plurality of mobile iframe management scripts linked to said webpage 1600, wherein said database 115 returns said mobile iframe management script to said processor 220 when said webpage 1600 has an associated mobile iframe management script.

As mentioned previously, the system 400 may further comprise a user interface 410. A user interface 410 may be defined as a space where interactions between a user 405 and the system 400 may take place. In an embodiment, the interactions may take place in a way such that a user 405 may control the operations of the system 400. A user interface 410 may include, but is not limited to operating systems, command line user interfaces, conversational interfaces, web-based user interfaces, zooming user interfaces, touch screens, task-based user interfaces, touch user interfaces, text-based user interfaces, intelligent user interfaces, and graphical user interfaces, or any combination thereof. The system 400 may present data of the user interface 410 to the user 405 via a display 316 operably connected to the processor 220. A display 316 may be defined as an output device that communicates data that may include, but is not limited to, visual, auditory, cutaneous, kinesthetic, olfactory, and gustatory, or any combination thereof.

Information presented via a display 316 may be referred to as a soft copy of the information because the information exists electronically and is presented for a temporary period of time. Information stored on the non-transitory computer-readable medium 415 may be referred to as the hard copy of the information. For instance, a display 316 may present a soft copy of visual information via a liquid crystal display (LCD), wherein the hardcopy of the visual information is stored on a local hard drive. For instance, a display 316 may present a soft copy of audio information via a speaker, wherein the hard copy of the audio information is stored on a flash drive. For instance, a display 316 may present a soft copy of tactile information via a haptic suit, wherein the hard copy of the tactile information is stored within a database 115. Displays 316 may include, but are not limited to, cathode ray tube monitors, LCD monitors, light emitting diode (LED) monitors, gas plasma monitors, screen readers, speech synthesizers, haptic suits, virtual reality headsets, speakers, and scent generating devices, or any combination thereof.

To prevent un-authorized user 405 from accessing other user's 405 information, the system 400 may employ a security method. As illustrated in FIG. 17, the security method of the system 400 may comprise a plurality of permission levels 1700 that may grant users 405 access to user content 1715, 1735, 1755 within the database 115 while simultaneously denying users 405 without appropriate permission levels 1700 the ability to view user content 1715, 1735, 1755. To access the user content 1715, 1735, 1755 stored within the database 115, users 405 may be required to make a request via a user interface 410. Access to the data within the database 115 may be granted or denied by the processor 220 based on verification of a requesting user's 1705, 1725, 1745 permission level 1700. If the requesting user's 1705, 1725, 1745 permission level 1700 is sufficient, the processor 220 may provide the requesting user 1705, 1725, 1745 access to user content 1715, 1735, 1755 stored within the database 115. Conversely, if the requesting user's 1705, 1725, 1745 permission level 1700 is insufficient, the processor 220 may deny the requesting user 1705, 1725, 1745 access to user content 1715, 1735, 1755 stored within the database 115. In an embodiment, permission levels 1700 may be based on user roles 1710, 1730, 1750 and administrator roles 1770, as illustrated in FIG. 17. User roles 1710, 1730, 1750 allow requesting users 1705, 1725, 1745 to access user content 1715, 1735, 1755 that a user 405 has uploaded and/or otherwise obtained through use of the system 400. Administrator roles 1770 allow administrators 1765 to access system 400 wide data.

In an embodiment, user roles 1710, 1730, 1750 may be assigned to a user in a way such that a requesting user 1705, 1725, 1745 may view user profiles 425 containing iframe data 425A via a user interface 410. In an embodiment, the system 400 may be configured to send a financial institution a notification indicating that a user has new iframe data 425A. To access the data within the database 115, a user 405 may make a user request via the user interface 410 to the processor 220. In an embodiment, the processor 220 may grant or deny the request based on the permission level 1700 associated with the requesting user 1705, 1725, 1745. Only users having appropriate user roles 1710, 1730, 1750 or administrator roles 1770 may access the data within the user profiles 425. For instance, as illustrated in FIG. 17, requesting user 1 1705 has permission to view user 1 content 1715 and user 2 content 1735 whereas requesting user 2 1725 only has permission to view user 2 content 1735. Alternatively, user content 1715, 1735, 1755 may be restricted in a way such that a user may only view a limited amount of user content 1715, 1735, 1755. For instance, requesting user 3 1745 may be granted a permission level 1700 that only allows them to view user 3 content 1755 related to their specific financial institution but not user 3 content 1755 related to other financial institutions. In the example illustrated in FIG. 17, an administrator 1765 may bestow a new permission level 1700 on users so that it may grant them greater permissions or lesser permissions. For instance, an administrator 1765 may bestow a greater permission level 1700 on other users so that they may view user 3's content 1755 and/or any other user's content 1715, 1735, 1755. Therefore, the permission levels 1700 of the system 400 may be assigned to users 405 in various ways without departing from the inventive subject matter described herein.

Figure 5:
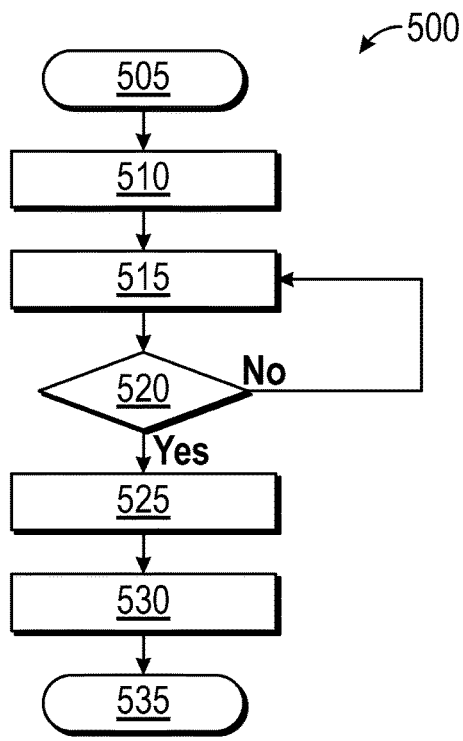
FIG. 5 is a flow chart illustrating certain method steps of a method embodying features consistent with the principles of the present disclosure.

All documents of a website have a height. If the height of a document is greater than the height of the window within the user interface 410 in which it is displayed, the user interface 410 may display a scroll bar that allows a user 405 to scroll through the document. Documents within the iframe 1615 also have a height, and in situations where the iframe 1615 is not large enough to display the i-document 1620, a scroll bar may also be present. FIG. 5 provides a flow chart 500 illustrating certain, preferred method steps that may be used to carry out the method of changing the size of the iframe 1615 within the parent-document 1610 such that the i-document 1620 is fully viewable within the webpage 1600 (height adjustment module). Step 505 indicates the beginning of the method. During step 510 the computing entity 200 may determine the height of the i-document 1620 within the iframe 1615. Once the height has been determined, the computing entity 200 may perform a query to determine if the height within the iframe 1615 has changed during step 515. The computing entity 200 may take an action depending on the results of the query during step 520. If the height of the i-document 1620 within the iframe 1615 has not changed, the computing entity 200 may continue to perform the query of step 515.

If the computing entity 200 determines that the height of the i-document 1620 within the iframe 1615 has changed, the computing entity 200 may communicate the height of the i-document 1620 to the processor 220 in step 525. In a preferred embodiment, the height of the i-document 1620 may be reported to the processor 220 using a message function. Once the processor 220 has received the height of the i-document 1620, the processor 220 may change the height property of the iframe 1615 within the parent-document 1610 to that of the height of the i-document 1620 during step 530. In a preferred embodiment, the height of the iframe 1615 is modified by changing the style.height property on the <div> element surrounding the iframe 1615. The style.height property may be modified by executing the autoLinkContainingDiv.style.height=height+'px' statement, wherein "height" contains the new height value. In another preferred embodiment, the processor 220 may apply the scrolling="no" attribute to the iframe 1615 to force the user interface 410 to not display a scroll bar, which may further produce the appearance that the i-document 1620 is part of the parent-document 1610. Once the height property of the iframe 1615 has been changed, the method may proceed to the terminate method step 535.

Figure 6:
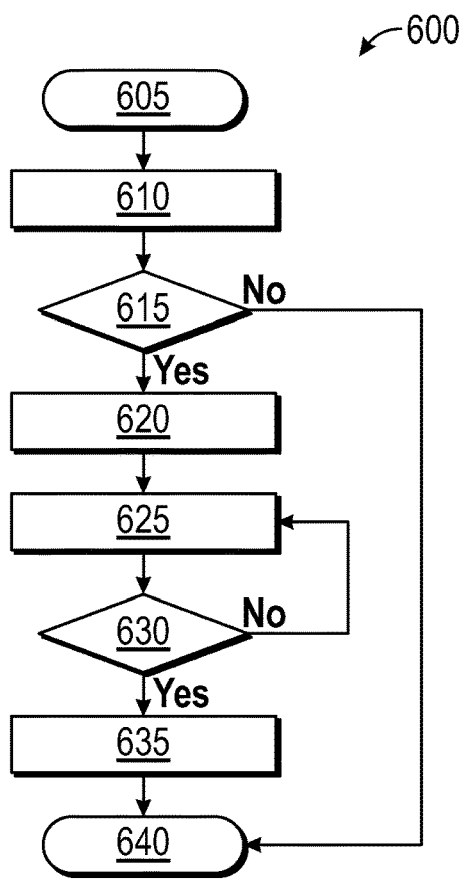
FIG. 6 is a flow chart illustrating certain method steps of a method embodying features consistent with the principles of the present disclosure.

A scroll-to-top link is a link 1625 often used on webpages 1600 that instantly move the view of the user interface 410 to the top of the webpage 1600. In a preferred embodiment, scroll-to-top links work by executing a window. scrollTo( ) function of the user interface 410. However, scroll-to-top functions of i-documents 1615 often do not work as intended because they may only shift the view of the user interface 410 to the top of the i-document 1620 within the iframe 1615 and not the parent-document 1610 the iframe 1615 is embedded within. FIG. 6 provides a flow chart 600 illustrating certain, preferred method steps that may be used to carry out the method of manipulating the iframe 1615 such that a scroll to top link within the iframe 1615 causes a scroll to top function to execute within the parent-document 1610, thus giving the appearance that the i-document 1620 is part of the parent-document 1610 (seamless scrolling module). Step 605 indicates the beginning of the method. During step 610 the computing entity 200 may perform a query to determine whether or not a scroll-to-top-link is present within a i-document 1620 of an iframe 1615. The computing entity 200 may perform an action depending on the results of the query during step 615. If the computing entity 200 determines that there are no scroll-to-top links within the i-document 1620, the method may proceed to the terminate method step 640. If the computing entity 200 determines that there are scroll-to-top links within the iframe 1615, the computing entity 200 may manipulate the scroll-to-top links into modified-scroll-to-top links within the user interface 410 during step 620. In a preferred embodiment, a modified-scroll-to-top link is a link 1625 that notifies the parent-document 1610 to execute a scroll-to-top function.

Once the computing entity 200 has manipulated the scroll-to-top links into modified-scroll-to-top links, the computing entity 200 may perform a query to determine whether or not the manipulated-scroll-to-top links have been selected by a user 405 within the iframe 1615 during step 625. The computing entity 200 may take an action during step 630 depending on the results of the query. If the computing entity 200 determines that no modified-scroll-to-top links have been selected, the computing entity 200 may continue to perform the query of step 625. If the computing entity 200 determines that a modified-scroll-to-top link has been selected, the computing entity 200 may send a message to the processor 220 to execute a scroll-to-top function in the parent-document 1610. In a preferred embodiment, the computing entity 200 may use the message function to communicate with the processor 220 that a selection of a modified-scroll-to-top link has been made by a user 405 within the iframe 1615. Once the processor 220 has executed the scroll-to-top function in the parent-document 1610, the method may proceed to the terminate method step 640.

Figure 7:
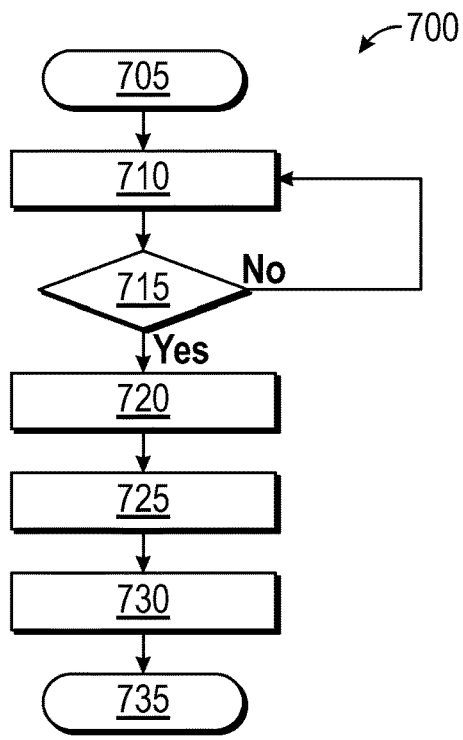
FIG. 7 is a flow chart illustrating certain method steps of a method embodying features consistent with the principles of the present disclosure.

When clicking a link 1625 on a webpage 1600, the idiomatic result is that the user interface 410 changes the document it is displaying to the document located at the URL specified by the link 1625. However, when selecting a link 1625 of an i-document 1620 within an iframe 1615, only the document within the iframe 1615 changes. FIG. 7 provides a flow chart 700 illustrating certain, preferred method steps that may be used to carry out the method of manipulating links 1625 of an i-document 1620 within the iframe 1615 such that the idiomatic result when selecting links 1625 of i-documents 1615 is that the user interface 410 changes the parent-document 1610 it is displaying to the document located at the URL specified by the selected link 1625 (external link module). Step 705 indicates the beginning of the method. During step 710 the computing entity 200 may perform a query to determine whether or not a link within an i-document 1620 has been selected by a user. During step 715, the computing entity 200 may take an action dependent on the results of the query. If the computing entity 200 determines that no link has been chosen within the iframe 1615, the computing entity 200 may continue to perform the query of step 710. If the computing entity 200 determines that a link within the i-document 1620 has been selected, the computing entity 200 may copy the URL of the selected link during step 720.

Once the URL of the selected link has been copied, the computing entity 200 may communicate the URL to the processor 220 during step 725. In a preferred embodiment, an event handler attached to each link 1625 by the iframe management script when the webpage 1600 is loaded within the iframe 1615 instructs the computing entity 200 to copy and communicate the URL information to the processor 220. In another preferred embodiment, the URL of the selected link 1625 within the i-document 1620 may be communicated to the processor 220 from the computing entity 200 via a message function. Once the processor 220 has received the URL, the processor 220 may change the URL of the parent-document 1610 to the URL of the selected link within the iframe 1615 during step 730. The method may proceed to the terminate method step 735 once the source variable has been modified.

Figure 8:
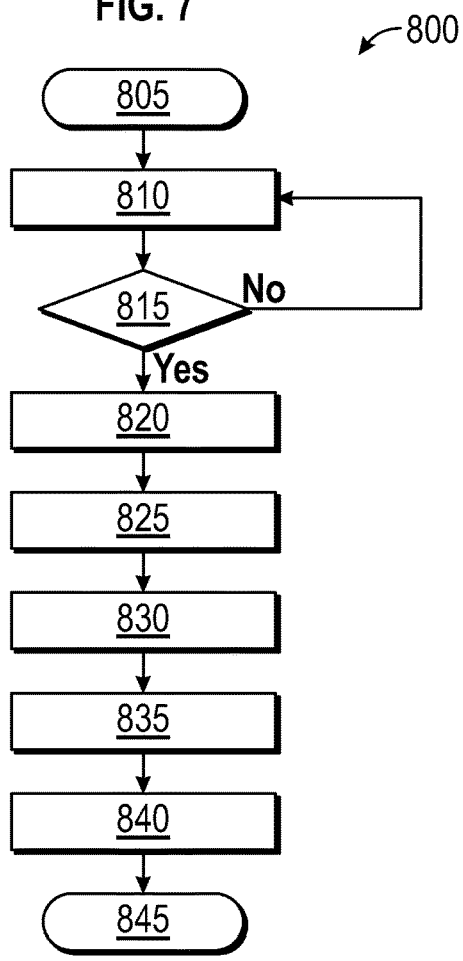
FIG. 8 is a flow chart illustrating certain method steps of a method embodying features consistent with the principles of the present disclosure.

The idiomatic result of submitting a form on a webpage 1600 is that the user interface 410 changes the document it is displaying to a different document specified by the <form> tag of the form that was submitted. For example, submitting an online banking login form changes the webpage 1600 presented by the user interface 410 to either the user's 405 online banking dashboard or to a webpage 1600 displaying a login failure notice. However, when submitting a form within an iframe 1615, only the document within the iframe 1615 changes. FIG. 8 provides a flow chart 800 illustrating certain, preferred method steps that may be used to carry out the method of manipulating forms inside the iframe 1615 such that they appear to function identically to forms submitted in the parent-document 1610 (external form submission module). Step 805 indicates the beginning of the method. During step 810 the computing entity 200 may perform a query to determine whether or not iframe data 425A has been input into the i-document 1620. Based on the results of the query, the computing entity 200 may perform an action during step 815. If the computing entity 200 determines that no iframe data 425A has been input into the i-document 1620, the computing entity 200 may continue to perform the query of step 810. If the computing entity 200 determines that iframe data 425A has been input into the i-document 1620, the computing entity 200 may copy the iframe data 425A during step 820.

Once the iframe data 425A has been copied, the computing entity 200 may create an iframe form comprising the iframe data 425A during step 825. The computing entity 200 may then transmit the iframe form from the iframe 1615 to the parent-document 1610 during step 830. In a preferred embodiment, communication between the i-document 1620 and parent-document 1610 may be facilitated via a message function. The processor 220 may create a replication form within said parent window 1605 using said iframe data 425A during step 835. Once the replication form has been created, the processor 220 may submit the replication form as if it were a form of the parent-document 1610 during step 840. In a preferred embodiment, the form element is created and submitted as follows:

form=window.document.createElement('form');
form.method='post';
form.action=data.form.action;
for (i=0; i<data.form.inputs.length; i+=1) {
inputElement=window.document.createElement('input');
inputElement.name=data.form.inputs[i].name;
inputElement.value=data.form.inputs[i].value;
form.appendChild(inputElement);
}
window.document.body.appendChild(form);
form. submit( );

The method may proceed to the terminate method step 845 once the replication form has been submitted.

Figure 9:
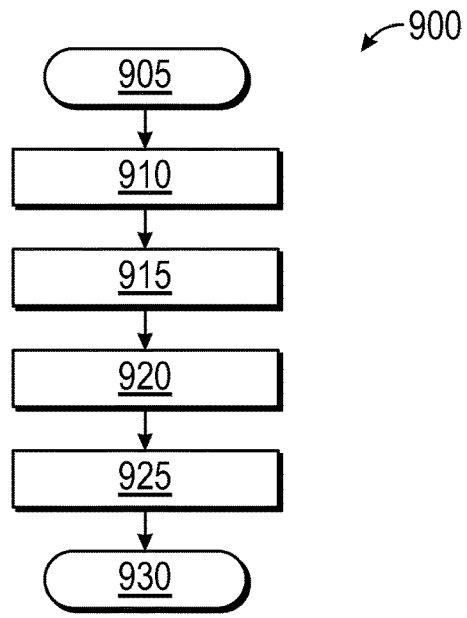
FIG. 9 is a flow chart illustrating certain method steps of a method embodying features consistent with the principles of the present disclosure.

When a user 405 clicks on a link 1625 of a webpage 1600, the user interface 410 performs an HTTP request to the server 110 referenced by the URL of the link 1625. Part of the HTTP request is a header called the Referer header, which contains the URL of the webpage 1600 the user 405 was on when they selected the link 1625. The purpose of the Referer header is to allow a server 110 to learn what other servers 110 are linking to it. However, user interfaces 410 loading webpages 1600 containing an iframe 1615 will send the URL of the webpage 1600 containing the iframe 1615 as the Referer header to the server 110 that hosts the contents of the iframe 1615 instead of sending the URL of the webpage 1600 that the user 405 was on when they selected the link 1625. FIG. 9 provides a flow chart 900 illustrating certain, preferred method steps that may be used to carry out the method of manipulating HTTP requests of links within the iframe 1615 such that the server of the iframe 1615 may learn the original referer header and subsequently use this information in analytics reports (HTTP referer tracking module). Step 905 indicates the beginning of the method. During step 910 the computing entity 200 may copy an original referer variable of the parent-document 1610, wherein the original referer variable of the parent-document 1610 is the URL of the webpage 1600 used to navigate to the current parent-document 1610. Once the computing entity 200 has copied the original referer variable, the computing entity 200 may create a query string using said referer variable during step 915. In a preferred embodiment, the query string is of the form referer=[URL], wherein [URL] is replaced by the original referer variable. The computing entity 200 may then transmit the query string to the processor 220 during step 920. Once the processor 220 has received the query string, the processor 220 may use the query string to modify the source variable of the iframe 1615 within the parent-document 1610 during step 925 such that servers may read and store the value of the original referer variable. Once the source variable has been modified, the method may proceed to the terminate method step 930.

Social media platforms have an automated system that generates site previews for posts containing links 1625.

Figure 10:
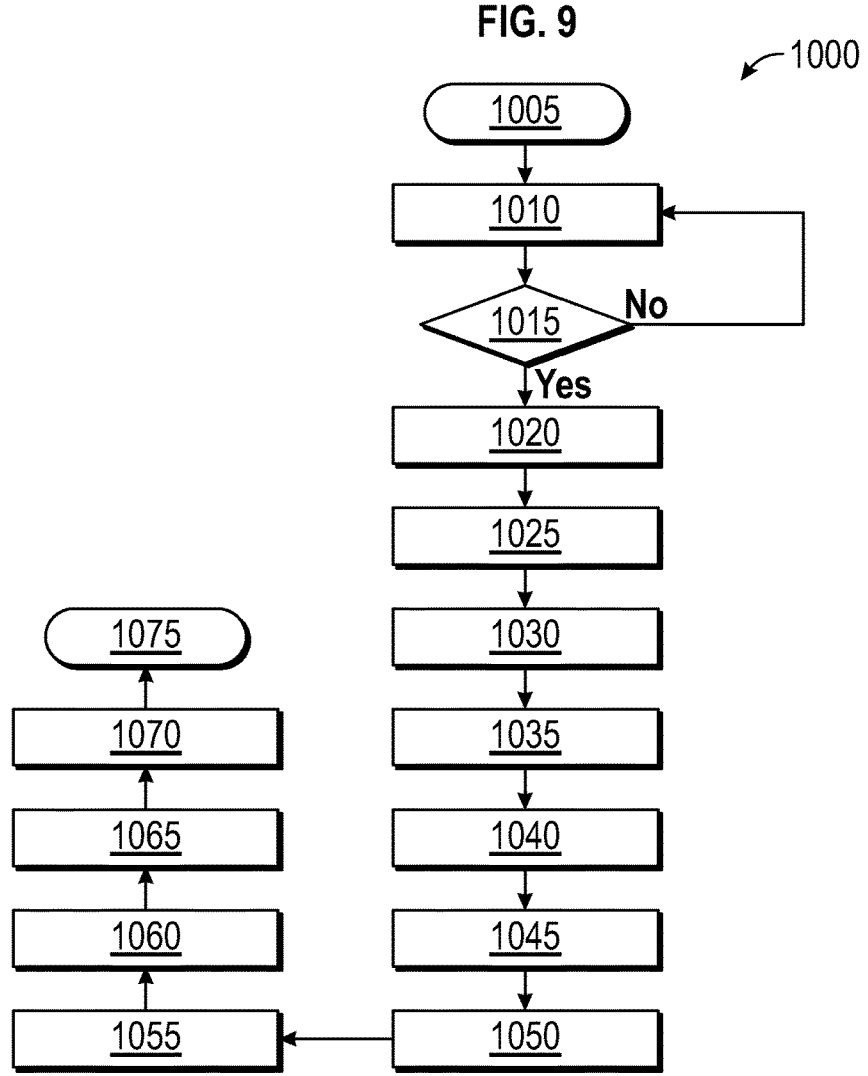
FIG. 10 is a flow chart illustrating certain method steps of a method embodying features consistent with the principles of the present disclosure.

However, these automated systems are not intelligent and often fail to produce a reasonable preview. FIG. 10 provides a flow chart 1000 illustrating certain, preferred method steps that may be used to carry out the method of providing social media platforms data so that they may generate reasonable site previews while directing the user 405 to the page on the client's side containing the iframe 1615, as intended when the user 405 clicks on the link 1625 within the social media platform (Open Graphs module). Step 1005 indicates the beginning of the method. During step 1010 the computing entity 200 may perform a query to determine whether a post has been made to a social media platform. The computing entity 200 may take an action dependent on the results of the query during step 1015. If the computing entity 200 determines that no attempt to make a post on a social media platform has been made, the computing entity 200 may continue to perform the query of step 1010. If the computing entity 200 determines that an attempt to make a post to a social media platform has been made, the computing entity 200 may copy the post in step 1020. Once the computing entity 200 has copied the post, the computing entity 200 may create a post record containing the data of the post, including the URL of the i-document 1620 and the post during step 1025. The computing entity 200 may then transmit the post record to the processor 220 during step 1030. Once the processor 220 has received the post record, the processor 220 may save the post record to a non-transitory computer-readable medium in step 1035. In another preferred embodiment, the processor 220 may transmit the post record to a database 115, wherein the database 115 may save the post record therein.

Once the post record has been saved, the processor 220 may assign a unique ID to the post record during step 1040. The processor 220 may then create an alternate URL by combining the URL of the i-document 1620 and post with the unique ID during step 1045. The processor 220 may then save the alternate ID during step 1050. In a preferred embodiment, the alternate URL is saved to the non-transitory computer-readable medium. After saving the alternate URL, the processor 220 may transmit the post to the social media platform using the alternate URL during step 1050. The processor 220 may then wait for a preview request from the social media platform during step 1055. Once the processor 220 receives the preview request from the social media platform, the processor 220 may generate a modified page during step 1060. In a preferred embodiment, the modified page is created by modifying the <head> HTML tag to contain Open Graph <meta> tags representing a relevant image, title, and description. The processor 220 may then transmit the modified page to the social media platform during step 1065. The <meta> tags may be of the form:
  <meta property="og:image" content="[URL]">
  <meta property="og:image:width" content="[WIDTH]">
  <meta property="og:image:height" content="[HEIGHT]">
wherein [URL] is replaced with the URL of the image, [WIDTH] is replaced with the width of the image in pixels, and [HEIGHT] is replaced with the height of the image in pixels. Once the modified page has been transmitted to the social media platform, the processor 220 may redirect the user interface 410 of the computing entity 200 from the webpage 1600 to the modified page during step 1070. Once the computing entity 200 has been redirected to the modified page, the method may proceed to the terminate method step 1075.

A ubiquitous feature of websites is the ability to link to the webpages 1600 inside them. Generally, each webpage 1600 will have a distinct URL. That URL may be put into an address bar of a user interface 410 to access that webpage 1600. It can also be used within <a> tags on other webpages 1600 to link from one webpage 1600 to another. When a user 405 is browsing a webpage 1600, the URL in the user interface 410 is set to the URL of the document they are browsing. When they switch to a different webpage 1600, the URL in the address bar user interface 410 changes accordingly. However, when an iframe 1615 is embedded in a parent-document 1610 of a webpage 1600, the URL of the i-document 1620 inside the iframe 1615 is usually different from the URL of the parent-document 1610 in which the iframe 1615 is embedded. However, no matter the i-document 1620 within the iframe 1615, the URL in the user interface 410 remains the URL of the parent-document 1610. That is, even if the webpage 1600 loaded in the iframe 1615 changes due to the user 405 activating a link inside the i-document 1620, the URL in the user interface 410 will not be updated accordingly. The modules represented by the methods presented in FIGS. 11 and 12 aim to restore standard web linking functionalities.

Figure 11:
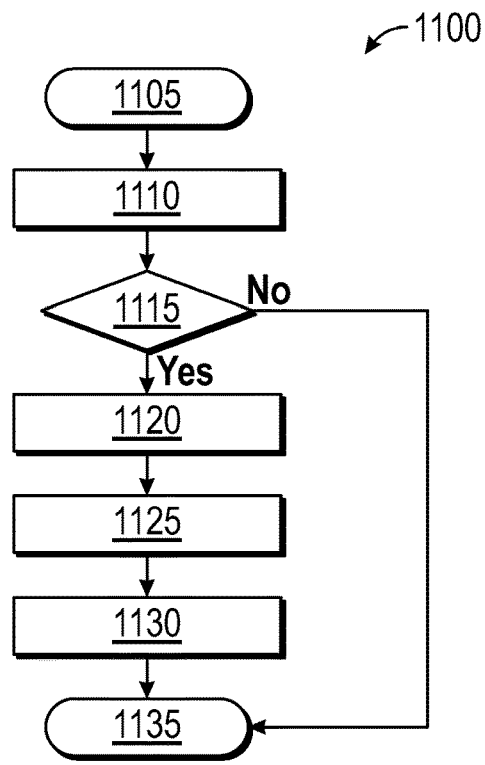
FIG. 11 is a flow chart illustrating certain method steps of a method embodying features consistent with the principles of the present disclosure.

FIG. 11 provides a flow chart 1100 illustrating certain, preferred method steps that may be used to carry out the method of manipulating the iframe 1615 in a way such that standard functionality of the address bar within the user interface 410 and of linking to pages within a website are effectively restored even though the Auto Link content is being served up through an iframe 1615 on a client site (first iframe linking module). Step 1105 indicates the beginning of the method. During step 1110 the computing entity 200 may perform a query to determine whether an i-document 1620 has been loaded within an iframe 1615 of a webpage 1600 via a user interface 410. Based on the results of the query, the computing entity 200 may perform an action during step 1115. If the computing entity 200 determines that no i-document 1620 has been loaded within an iframe 1615 of a webpage 1600, the method may proceed to the terminate method step 1135. If the computing entity 200 determines that an i-document 1620 has been loaded within an iframe 1615, the computing entity 200 may copy the pathname of the source variable of the i-document 1620 during step 1120. Once the pathname has been copied, the computing entity 200 may transmit the pathname to the processor 220 during step 1125. In a preferred embodiment, the computing entity 200 may use a message function to communicate the pathname to the processor 220. Once the processor 220 has received the pathname, the processor 220 may manipulate the autolink hash of the parent window 1605 to match the pathname of the i-document 1620 during step 1130, wherein the autolink variable may be in the form of #AutoLinkPage=[pathname]. In one preferred embodiment, the hash is set on the outer document via window.location.hash="#AutoLinkPage="+path, wherein "path" is replaced with the URL path of the inner document that is received via the message function. Once the autolink hash has been manipulated, the method may proceed to the terminate method step 1135.

Figure 12:
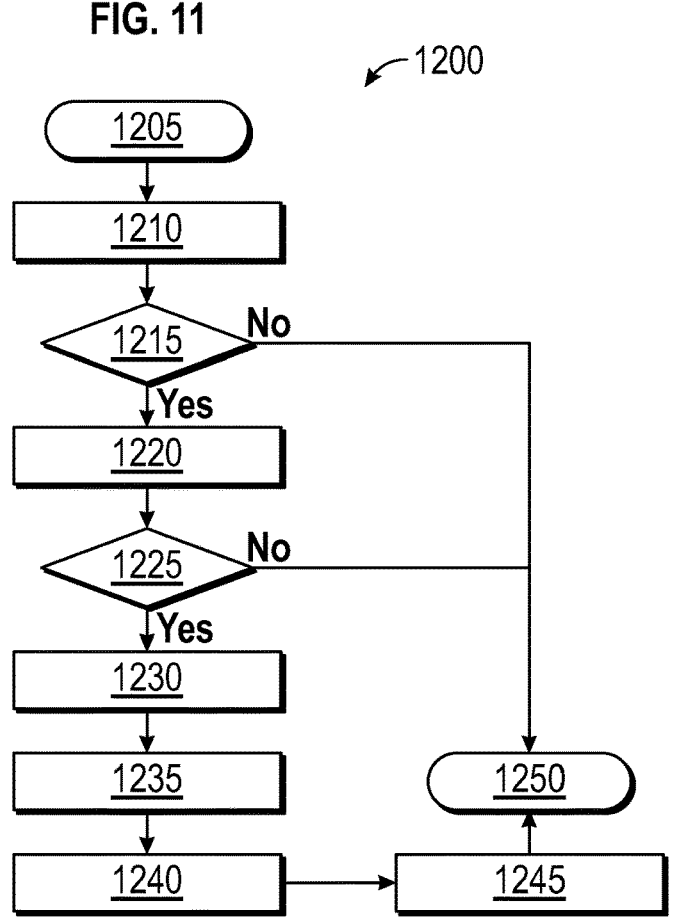
FIG. 12 is a flow chart illustrating certain method steps of a method embodying features consistent with the principles of the present disclosure.

FIG. 12 provides a flow chart 1200 illustrating certain, preferred method steps that may be used to carry out the method of manipulating the iframe 1615 in a way such that standard functionality of the address bar within the user interface 410 and of linking to pages within a website are effectively restored even though the Auto Link content is being served up through an iframe 1615 on a client site (second iframe linking module). Step 1205 indicates the beginning of the method. During step 1210 the computing entity 200 may perform a query to determine whether a webpage 1600 has been loaded within the user interface 410 of the computing entity 200. The computing entity 200 may perform an action based on the results of the query during step 1215. If the computing entity 200 determines a webpage 1600 has not been loaded within the user interface 410, the method may proceed to the terminate method step 1250. If the computing entity 200 determines that a webpage 1600 has been loaded within the user interface 410, the computing entity 200 may perform a query to determine whether the URL of the webpage 1600 contains a hash with an autolink variable during step 1220. Depending on the results of the query, the computing entity 200 may perform an action during step 1225. If the computing entity 200 determines that the URL does not contain a hash with an autolink variable, the method may proceed to the terminate method step 1250. If the computing entity 200 determines that the URL does contain a hash with an autolink variable, the computing entity 200 may copy the pathname of the autolink variable during step 1230. In a preferred embodiment, a hash having an autolink variable may be in the form of #AutoLinkPage=[pathname]. Once the computing entity 200 has copied the pathname of the autolink variable, the computing entity 200 may manipulate the pathname into a text string during step 1235, wherein the text string comprises the pathname with a "/" appended to the beginning of it. Once the computing entity 200 has created the text string, the computing entity 200 may transmit the text string to the processor 220 during step 1240. The processor 220 may then append the URL within the iframe's 1615 source variable by adding the modified text string during step 1245. Once the modified text string has been added to the URL of the iframe 1615, the processor 220 may proceed to the terminate method step 1250.

Figure 13:
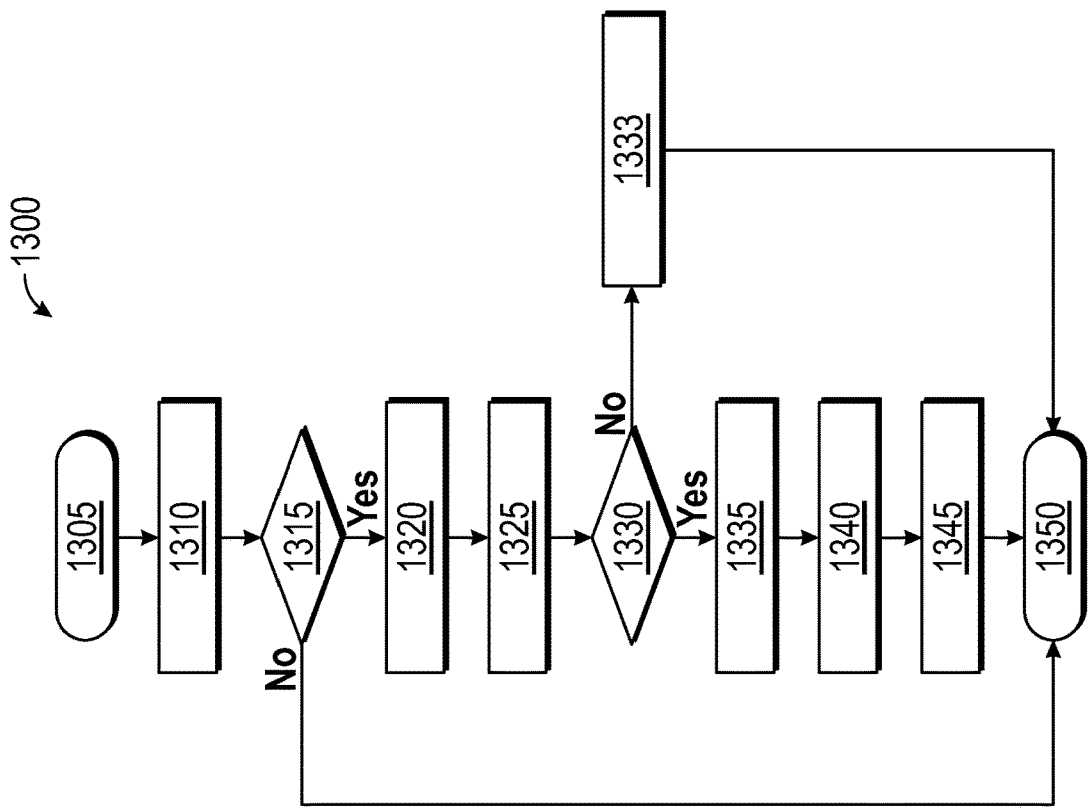
FIG. 13 is a flow chart illustrating certain method steps of a method embodying features consistent with the principles of the present disclosure.

An iframe 1615 requires a minimum width to display its contents properly to a user 405. However, the width available on some webpages 1600 is less than the minimum width needed for the iframe 1615. FIG. 13 provides a flow chart 1300 illustrating certain, preferred method steps that may be used to carry out the method of injecting JavaScript code into webpages 1600 that resizes or moves around elements of the webpage 1600 as needed in order to fit an iframe 1615 (JavaScript injection module). Step 1305 indicates the beginning of the method. During step 1310 the computing entity 200 may perform a query to determine whether the webpage loaded within the user interface 410 has a modified HTML code. In a preferred embodiment, the modified HTML code may be of the form <script src=https://[server]/[example]/portal.js></script>, where [server] is replaced with the URI of the server 110 and [example] is replaced with a client ID in the form of a text string. The computing entity 200 may perform an action based on the results of the query during step 1315. If the computing entity 200 determines that the webpage 1600 does not contain a modified HTML code, the method may proceed to the terminate method step 1350. If the computing entity 200 determines that the webpage 1600 contains a modified HTML code, the computing entity 200 may submit a request to the processor 220 for JavaScript code during step 1320, which will reorganize the webpage 1600 for an iframe 1615. In a preferred embodiment, the computing entity 200 may request the /[example]/portal.js file, wherein the /[example]/portal.js file contains a JavaScript text block containing JavaScript instructions that may reorganize a webpage 1600. Once the processor 220 has received the request from the computing entity 200, the processor 220 may perform a query during step 1325 to determine if the website associated with the request has a non-empty JavaScript text block, wherein the JavaScript text block comprises code that may instruct the computing entity 200 on how to rearrange its webpages 1600.

The processor 220 may perform an action based on the results of the query during step 1330. If the processor 220 determines that the website has an empty JavaScript text block associated therewith, the processor 220 may communicate to the computing entity 200 that no JavaScript code exists for the website during step 1333. The method may then proceed to the terminate method step 1350. If the processor 220 determines that the website has a non-empty JavaScript text block associated therewith, the processor 220 may transmit the JavaScript text block to the computing entity 200 during step 1335. Once the computing entity 200 has received the JavaScript code from the JavaScript text block, the computing entity 200 may execute the JavaScript code such that it rearranges elements of the webpage 1600 within the user interface 410 during step 1340. The computing entity 200 may then render the iframe 1615 within the webpage 1600 during step 1345. Once the iframe 1615 has been rendered, the method may proceed to the terminate method step 1350.

A webpage 1600 is "mobile responsive" if it is designed in such a way that it may resize dynamically to fit properly on the screen of a mobile computing device 350. However, an iframe 1615 cannot detect if a website is mobile responsive and set its own responsiveness accordingly. FIG. 14 provides a flow chart 1400 illustrating certain, preferred method steps that may be used to carry out the method of modifying the width of the iframe 1615 for the user interface 410 of a mobile computing device for webpages that are mobile responsive (mobile computing module). Step 1405 indicates the beginning of the method. During step 1410 the user interface 410 of the computing entity 200 loads a webpage 1600. The computing entity 200 may then submit a request to the processor 220 for a mobile iframe management script during step 1415 depending on if the user interface 410 requires a mobile version of the website. The processor 220 may perform an action based on whether or not a request has been submitted during step 1420. If the computing entity 200 does not submit a request to the processor 220 for a mobile iframe management script, the processor 220 may proceed to the terminate method step 1445. If the computing entity 200 does submit a request to the processor 220 for a mobile iframe management script, the processor 220 may perform a query during step 1425 to determine whether or not a mobile iframe management script is on file for the website. The processor 220 may perform an action based on the results of the query during step 1430. If the processor 220 determines that no mobile iframe management script exists for the website, the processor 220 transmit a signal to the computing entity 200 that no mobile iframe management script exists for the website during step 1433, which may cause computing entity 200 to adjust the width of the iframe 1615 within the user interface 410 to fit the display. Once the computing entity 200 has adjusted the iframe 1615, the method may proceed to the terminate method step 1445.

If the processor 220 determines that a mobile iframe management script exists for the website, the processor 220 may transmit the mobile iframe management script to the computing entity 200 during step 1435. In a preferred embodiment, the mobile iframe management script is stored within a database 115 operably connected to the processor 220. In another preferred embodiment, the mobile iframe management script is stored within a non-transitory computer readable medium that is operably connected to the processor 220. Once the mobile iframe management script has been transmitted to the computing entity 200, the computing entity 200 may execute the instructions of the mobile iframe management script during step 1440, wherein the instructions of the mobile iframe management script may instruct the computing entity 200 to modify the webpage 1600 displayed within the user interface 410 such that the width of the webpage 1600 is no wider than the display of the computing entity 200. In a preferred embodiment, the width of the parent-document 1610 within the parent window 1605, iframe 1615 within the parent-document 1610, and i-document 1620 within the iframe 1615 are all manipulated by the mobile iframe management script to fit within the display. Once the computing entity 200 has executed the mobile iframe management script, the method may proceed to the terminate method step 1445.

Standard websites use a Cascading Style Sheets (CSS) mechanism for ensuring that different webpages 1600 on the website share similar stylings. However, when an iframe 1615 is embedded within a parent-document 1610 of a webpage 1600, none of the CSS styles which apply to the parent-document 1610 apply to the i-document 1620 inside the iframe 1615. Any styles that apply inside the iframe 1615 must be specified on the i-document 1620 itself. FIG. 15 provides a flow chart 1500 illustrating certain, preferred method steps that may be used to carry out the method of changing the internal styling of an i-document 1620 to match the styling of the parent-document 1610 (internal styling module). Step 1505 indicates the beginning of the method. During step 1510 the computing entity 200 may determine the src attribute of the iframe 1615. In a preferred embodiment, when the iframe management script inserts the <iframe> in the outer document, it specifies the src attribute on the iframe to be a URL of the form https://[server]/[client-ID], where [server] is replaced with the URI of the server 110 and [client-ID] is a unique identifier assigned to each client. Once the src attribute has been determined, the computing entity 200 may query a database 115 for a Client ID associated with the src attribute during step 1515. The computing entity 200 may then perform an action depending on the results of the query during step 1520. If the database 115 does not contain a resulting page having a CSS URL, the method may proceed to the terminate method step 1535. If the database 115 does contain a resulting page having a CSS URL, the computing entity 200 may receive the resulting page from the database 115 and transmit the CSS URL back to the database 115 to receive CSS styles of the parent-document 1610 during step 1525. In a preferred embodiment, a <link> element is placed on the resulting page which is served back to the user's web browser if the text block is non-empty. This <link> element contains as its URL /[client-ID]/custom.css. Once the CSS styles have been received, the computing entity 200 may modify the i-document 1620 within the iframe 1615 during step 1530. The method may then proceed to the terminate method step 1535.

The subject matter described herein may be embodied in systems, apparati, methods, and/or articles depending on the desired configuration. In particular, various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that may be executable and/or interpretable on a programmable system including at least one programmable processor, which may be special or general purpose, coupled to receive data and instructions from, and to transmit data and instructions to, a storage system, and at least one peripheral device.

These computer programs, which may also be referred to as programs, software, applications, software applications, components, or code, may include machine instructions for a programmable processor, and may be implemented in a high-level procedural and/or object-oriented programming language, and/or in assembly machine language. As used herein, the term "non-transitory computer-readable medium" refers to any computer program, product, apparatus, and/or device, such as magnetic discs, optical disks, memory, and Programmable Logic Devices (PLDs), used to provide machine instructions and/or data to a programmable processor, including a non-transitory computer-readable medium that receives machine instructions as a computer-readable signal. The term "computer-readable signal" refers to any signal used to provide machine instructions and/or data to a programmable processor. To provide for interaction with a user, the subject matter described herein may be implemented on a computer having a display device, such as a cathode ray tube (CRD), liquid crystal display (LCD), light emitting display (LED) monitor for displaying information to the user and a keyboard and a pointing device, such as a mouse or a trackball, by which the user may provide input to the computer. Displays may include, but are not limited to, visual, auditory, cutaneous, kinesthetic, olfactory, and gustatory displays, or any combination thereof.

Other kinds of devices may be used to facilitate interaction with a user as well. For instance, feedback provided to the user may be any form of sensory feedback, such as visual feedback, auditory feedback, or tactile feedback; and input from the user may be received in any form including, but not limited to, acoustic, speech, or tactile input. The subject matter described herein may be implemented in a computing system that includes a back-end component, such as a data server, or that includes a middleware component, such as an application server, or that includes a front-end component, such as a client computer having a graphical user interface or a Web browser through which a user may interact with the system described herein, or any combination of such back-end, middleware, or front-end components. The components of the system may be interconnected by any form or medium of digital data communication, such as a communication network. Examples of communication networks may include, but are not limited to, a local area network ("LAN"), a wide area network ("WAN"), metropolitan area networks ("MAN"), and the internet.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For instance, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, devices, and arrangements of the parts and method stages which have been described and illustrated in order to explain the nature of this inventive subject matter can be made without departing from the principles and scope of the inventive subject matter.

What is claimed is:

1. A system for integrating an iframe into a webpage comprising:
a computing entity,
wherein said computing entity allows a user to connect to a network via a user interface,
a processor operably connected to said computing entity via said network,
wherein said processor interacts with said computing entity via said user interface based on commands of said user,
a non-transitory computer-readable medium coupled to said processor,
wherein said non-transitory computer-readable medium contains said webpage,
wherein said non-transitory computer-readable medium contains instructions stored thereon, which, when executed by said processor, cause said processor to perform operations comprising:
granting said user interface of said computing entity access to said webpage,
wherein said webpage is presented to said user via a parent window of said user interface,
wherein said webpage comprises a parent-document having said iframe embedded within,
wherein said iframe comprises an i-document,
facilitating communication between said parent-document and said i-document via a message function,
integrating said i-document into said parent-document via an iframe management script,
wherein loading said parent-document causes said iframe management script to be executed by said processor,
wherein said iframe management script authorizes said parent document and said i-document to communicate with one another via said message function.

2. The system of claim 1, further comprising a database operably connected to said processor,
wherein said database saves iframe data and personal data,
wherein said database associates said iframe data and said personal data with an Internet Service Provider (ISP) address of said user,
wherein said commands of said user are saved as said iframe data.

3. The system of claim 2, wherein said database stores said iframe data within user profiles,
wherein permission levels may limit access to said iframe data within said user profiles.

4. The system of claim 1, wherein said non-transitory computer-readable medium contains additional instructions, which, when executed by said processor, cause said processor to perform additional operations comprising:
checking a height of said i-document within said iframe,
determining whether said height of said i-document has changed,
communicating said height of said i-document to said parent-document using said message function as authorized by said iframe management script when said height has changed, and
changing said height of said iframe based on said height of said i-document.

5. The system of claim 1, wherein said non-transitory computer-readable medium contains additional instructions, which, when executed by said processor, cause said processor to perform additional operations comprising:
determining whether a scroll-to-top link exists within said i-document,
manipulating said scroll-to-top link into a modified scroll-to-top link,
determining whether said modified scroll-to-top link has been selected,
communicating with said parent-document using said message function when it is determined said modified scroll-to-top link has been selected, and
executing a scroll-to-top function of said parent-document.

6. The system of claim 1, wherein said non-transitory computer-readable medium contains additional instructions, which, when executed by said processor, cause said processor to perform additional operations comprising:
determining whether a link exists within said i-document,
determining whether a link has been selected within said i-document, reading a URL of said link when it is determined that said link has been selected within said i-document,
communicating said URL of said link to said parent-document using said message function, and
changing said i-document within said iframe to said i-document located at said URL.

7. The system of claim 1, wherein said non-transitory computer-readable medium contains additional instructions, which, when executed by said processor, cause said processor to perform additional operations comprising:
determining whether iframe data has been input into said i-document,
reading said iframe data when it is determined that said iframe data has been input into said i-document,
creating an iframe form within said iframe using said iframe data that has been input into said i-document,
communicating said iframe form to said parent-document using said message function,
creating a replication form within said parent window based on said iframe form, and
submitting said replication form of said parent window.

8. The system of claim 1, wherein said non-transitory computer-readable medium contains additional instructions, which, when executed by said processor, cause said processor to perform additional operations comprising:
reading a referer variable of said parent-document, and
modifying a URL of said iframe to include a query string, wherein said query string uses said referer variable.

9. The system of claim 1, wherein said non-transitory computer-readable medium contains additional instructions, which, when executed by said processor, cause said processor to perform additional operations comprising:
determining whether an attempt to make a post to a social media platform has been made,
reading said post when it is determined an attempt to make said post to said social media platform has been made,
creating a post record of said post,
wherein said post record contains a URL of said i-document and said post, transmitting said post record to a database,
assigning said post record a unique ID, creating an alternate URL using said URL and said unique ID,
  wherein said alternate URL is saved to said non-transitory computer-readable medium,
transmitting said post to said social media platform from said alternate URL,
waiting for a request from said social media platform for said alternate URL,
receiving said request from said social media platform for said alternate URL,
generating a modified page when said request for said alternate URL is received from said social media platform,
sending said modified page to said social media platform, and
redirecting said user interface to said alternate URL once said modified page has been sent to said social media platform.

10. The system of claim 1, wherein said non-transitory computer-readable medium contains additional instructions, which, when executed by said processor, cause said processor to perform additional operations comprising:
  determining whether said i-document has been loaded within said iframe,
  reading a pathname of said i-document when said i-document has been loaded within said webpage,
  communicating said pathname of said i-document to said parent-document using said message function, and
  manipulating a hash variable of said parent window using said pathname such that changing said i-document within said iframe causes a URL to update based on said hash variable.

11. The system of claim 1, wherein said non-transitory computer-readable medium contains additional instructions, which, when executed by said processor, cause said processor to perform additional operations comprising:
  determining whether said webpage having said iframe has been loaded within said user interface,
  checking a hash of said webpage for an autolink variable when said webpage has been loaded within said user interface,
  extracting a pathname within said autolink variable when it is determined said autolink variable exists within said hash,
  manipulating said pathname into a text string, and
  adding said modified text string to a URL of said iframe.

12. The system of claim 1, wherein said non-transitory computer-readable medium contains additional instructions, which, when executed by said processor, cause said processor to perform additional operations comprising:
  checking said webpage for a modified HTML code,
  querying a database to determine whether said webpage has a non-empty text block associated therewith,
  receiving JavaScript code from said database when said text block is not empty,
  modifying said webpage based on said JavaScript code such that said iframe fits within said parent-document, and
  rendering said iframe within said parent-document.

13. The system of claim 1, wherein said non-transitory computer-readable medium contains additional instructions, which, when executed by said processor, cause said processor to perform additional operations comprising:
  determining whether said webpage loaded within said user interface has been loaded on a mobile computing device,
  querying a database to determine whether said webpage is mobile responsive,
  receiving a mobile iframe management script from said database when it is determined said webpage is mobile responsive, and
  executing said mobile iframe management script once said mobile iframe management script has been received, and
  changing a width of said iframe such that said width is tailored for displaying on said computing entity when it is determined said webpage is not mobile responsive.

14. The system of claim 1, wherein said non-transitory computer-readable medium contains additional instructions, which, when executed by said processor, cause said processor to perform additional operations comprising:
  determining a src attribute of said iframe,
  querying a database for a Client ID associated with said src attribute,
  receiving a resulting page from said database containing a Cascading Style Sheets (CSS),
    wherein said CSS URL is associated with said Client ID of said src attribute, and
  transmitting said CSS URL to said user interface,
    wherein said user interface transmits said CSS URL to said database and receives CSS styles from said database,
  modifying said i-document of said iframe based on said CSS styles.

15. A system for integrating an iframe into a webpage comprising:
  a computing entity,
    wherein said computing entity allows a user to connect to a network via a user interface,
  a processor operably connected to said computing entity via said network,
    wherein said processor interacts with said computing entity via said user interface based on commands of said user,
    wherein said commands are recorded as iframe data,
  a database operably connected to said processor,
    wherein said database saves said iframe data and personal data,
    wherein said database associates said iframe data and said personal data with an Internet Service Provider (ISP) address of said user,
  a non-transitory computer-readable medium coupled to said processor,
    wherein said non-transitory computer-readable medium contains said webpage,
    wherein said non-transitory computer-readable medium contains instructions stored thereon, which, when executed by said processor, cause said processor to perform operations comprising:
      accessing said webpage via said user interface of said computing entity,
        wherein said webpage comprises a parent-document having an iframe management script,
        wherein said iframe management script dictates where to embed said iframe within said parent-document,
        wherein said iframe contains an i-document,
        wherein said iframe management script of said parent-document communicates with said i-document via a message function,
        wherein loading said parent-document causes said iframe management script to be executed by said processor, wherein said iframe management script authorizes said parent document and said i-document to communicate with one another via said message function reading a plurality of modules of said iframe management script, executing a dynamic height adjustment module of said iframe management script, executing a seamless scrolling module of said iframe management script, executing an external link module of said iframe management script, executing an external form submission module of said iframe management script, and executing a dynamic internal styling module of said iframe management script.

16. The system of claim 15, wherein said dynamic height adjustment module of said iframe management script comprises said instructions of:

checking a height of said i-document within said iframe, determining whether said height of said i-document has changed, communicating said height of said i-document to said parent-document using said message function as authorized by said iframe management script when said height has changed, and changing said height of said iframe based on said height of said i-document.

17. The system of claim 15, wherein said seamless scrolling module of said iframe management script comprises said instructions of:

determining whether a scroll-to-top link exists within said i-document, manipulating said scroll-to-top link into a modified scroll-to-top link, determining whether said modified scroll-to-top link has been selected, communicating with said parent-document using said message function when it is determined said modified scroll-to-top link has been selected, and executing a scroll-to-top function of said parent-document.

18. The system of claim 15, wherein said external link module of said iframe management script comprises said instructions of:

determining whether a link exists within said i-document, determining whether a link has been selected within said i-document, reading a URL of said link when it is determined that said link has been selected within said i-document, communicating said URL of said link to said parent-document using said message function, and changing said i-document within said iframe to said i-document located at said URL.

19. The system of claim 15, wherein said external form submission module of said iframe management script comprises said instructions of:

determining whether said iframe data has been input into said i-document, reading said iframe data when it is determined that said iframe data has been input into said i-document, creating an iframe form within said iframe using said iframe data that has been input into said i-document, communicating said iframe form to said parent-document using said message function, creating a replication form within said parent window based on said iframe form, and submitting said replication form of said parent window.

20. The system of claim 15, wherein said dynamic internal styling module of said iframe management script comprises said instructions of:

determining a src attribute of said iframe, querying said database for a Client ID associated with said src attribute, receiving a resulting page from said database containing a Cascading Style Sheets (CSS), wherein said CSS URL is associated with said Client ID of said src attribute, and transmitting said CSS URL to said user interface,
wherein said user interface transmits said CSS URL to said database and receives CSS styles from said database, modifying said i-document of said iframe based on said CSS styles.

21. The system of claim 15, further comprising an HTTP referer tracking module stored on said non-transitory computer-readable medium, which comprises said instructions of:

reading a referer variable of said parent-document, and modifying a URL of said iframe to include a query string, wherein said query string uses said referer variable.

22. The system of claim 15, wherein said iframe management script further comprises an Open Graphs module, which comprises said instructions of:

determining whether an attempt to make a post to a social media platform has been made, reading said post when it is determined an attempt to make said post to said social media platform has been made, creating a post record of said post,
wherein said post record contains a URL of said i-document and said post, transmitting said post record to said database, assigning said post record a unique ID, creating an alternate URL using said URL and said unique ID,
wherein said alternate URL is saved to said non-transitory computer-readable medium, transmitting said post to said social media platform from said alternate URL, waiting for a request from said social media platform for said alternate URL, receiving said request from said social media platform for said alternate URL, generating a modified page when said request for said alternate URL is received from said social media platform, sending said modified page to said social media platform, and redirecting said user interface to said alternate URL once said modified page has been sent to said social media platform.

23. The system of claim 15, wherein said iframe management script further comprises a first iframe linking module, which comprises said instructions of:

determining whether said i-document has been loaded within said iframe, reading a pathname of said i-document when said i-document has been loaded within said webpage, communicating said pathname of said i-document to said parent-document using said message function, and manipulating a hash variable of said parent window using said pathname such that changing said i-document within said iframe causes a URL to update based on said hash variable.

24. The system of claim 15, wherein said iframe management script further comprises a second iframe linking module, which comprises said instructions of:
   determining whether said webpage having said iframe has been loaded within said user interface,
   checking a hash of said webpage for an autolink variable when said webpage has been loaded within said user interface,
   extracting a pathname within said autolink variable when it is determined said autolink variable exists within said hash,
   manipulating said pathname into a text string, and
   adding said modified text string to a URL of said iframe.

25. The system of claim 15, wherein said iframe management script further comprises a JavaScript injection module, which comprises said instructions of:
   checking said webpage for a modified HTML code,
   querying said database to determine whether said webpage has a non-empty text block associated therewith,
   receiving JavaScript code from said database when said text block is not empty,
   modifying said webpage based on said JavaScript code such that said iframe fits within said parent-document, and
   rendering said iframe within said parent-document.

26. The system of claim 15, wherein said iframe management script further comprises a mobile responsiveness module, which comprises said instructions of:
   determining whether said webpage loaded within said user interface has been loaded on a mobile computing device,
   querying said database to determine whether said webpage is mobile responsive,
   receiving a mobile iframe management script from said database when it is determined said webpage is mobile responsive, and
   executing said mobile iframe management script once said mobile iframe management script has been received, and
   changing a width of said iframe such that said width is tailored for displaying on said computing entity when it is determined said webpage is not mobile responsive.

27. The system of claim 15, wherein said database stores said iframe data within user profiles,
   wherein permission levels may limit access to said iframe data within said user profiles.

28. A method for integrating an iframe into a webpage comprising steps of:
   providing a computing entity connected to a network,
   generating said webpage within a user interface of said computing entity,
      wherein said webpage comprises a parent-document having said iframe embedded within,
      wherein said iframe comprises an i-document,
      wherein said parent-document and said i-document communicate with one another via a message function, and
   executing an iframe management script of said webpage,
      wherein loading said parent-document causes said iframe management script to be executed by said computing entity,
      wherein said iframe management script authorizes said parent document and said i-document to communicate with one another via said message function.

29. The method of claim 28, further comprising said steps of:
   checking a height of said i-document within said iframe,
   determining whether said height of said i-document has changed,
   communicating said height of said i-document to said parent-document using said message function as authorized by said iframe management script when said height has changed, and
   changing said height of said iframe based on said height of said i-document.

30. The method of claim 28, further comprising said steps of:
   determining whether a scroll-to-top link exists within said i-document,
   manipulating said scroll-to-top link into a modified scroll-to-top link,
   determining whether said modified scroll-to-top link has been selected,
   communicating with said parent-document using said message function when it is determined said modified scroll-to-top link has been selected, and
   executing a scroll-to-top function of said parent-document.

31. The method of claim 28, further comprising said steps of:
   determining whether a link exists within said i-document,
   determining whether a link has been selected within said i-document,
   reading a URL of said link when it is determined that said link has been selected within said i-document,
   communicating said URL of said link to said parent-document using said message function, and
   changing said i-document within said iframe to said i-document located at said URL.

32. The method of claim 28, further comprising said steps of:
   determining whether iframe data has been input into said i-document,
   reading said iframe data when it is determined that said iframe data has been input into said i-document,
   creating an iframe form within said iframe using said iframe data that has been input into said i-document,
   communicating said iframe form to said parent-document using said message function,
   creating a replication form within said parent window based on said iframe form, and
   submitting said replication form of said parent window.

33. The method of claim 28, further comprising said steps of:
   reading a referer variable of said parent-document, and
   modifying a URL of said iframe to include a query string, wherein said query string uses said referer variable.

34. The method of claim 28, further comprising said steps of:
   determining whether an attempt to make a post to a social media platform has been made,
   reading said post when it is determined an attempt to make said post to said social media platform has been made,
   creating a post record of said post,
      wherein said post record contains a URL of said i-document and said post,
   transmitting said post record to a database,
   assigning said post record a unique ID,
   creating an alternate URL using said URL and said unique ID,
      wherein said alternate URL is saved to a non-transitory computer-readable medium, transmitting said post to said social media platform from said alternate URL,
waiting for a request from said social media platform for said alternate URL,
receiving said request from said social media platform for said alternate URL,
generating a modified page when said request for said alternate URL is received from said social media platform,
sending said modified page to said social media platform, and
redirecting said user interface to said alternate URL once said modified page has been sent to said social media platform.

35. The method of claim 28, further comprising said steps of:
determining whether said i-document has been loaded within said iframe,
reading a pathname of said i-document when said i-document has been loaded within said webpage,
communicating said pathname of said i-document to said parent-document using said message function, and
manipulating a hash variable of said parent window using said pathname such that changing said i-document within said iframe causes a URL to update based on said hash variable.

36. The method of claim 28, further comprising said steps of:
determining whether said webpage having said iframe has been loaded within said user interface,
checking a hash of said webpage for an autolink variable when said webpage has been loaded within said user interface,
extracting a pathname within said autolink variable when it is determined said autolink variable exists within said hash,
manipulating said pathname into a text string, and
adding said modified text string to a URL of said iframe.

37. The method of claim 28, further comprising said steps of:
checking said webpage for a modified HTML code,
querying a database to determine whether said webpage has a non-empty text block associated therewith,
receiving JavaScript code from said database when said text block is not empty,
modifying said webpage based on said JavaScript code such that said iframe fits within said parent-document, and
rendering said iframe within said parent-document.

38. The method of claim 28, further comprising said steps of:
determining whether said webpage loaded within said user interface has been loaded on a mobile computing device,
querying a database to determine whether said webpage is mobile responsive,
receiving a mobile iframe management script from said database when it is determined said webpage is mobile responsive, and
executing said mobile iframe management script once said mobile iframe management script has been received, and
changing a width of said iframe such that said width is tailored for displaying on said computing entity when it is determined said webpage is not mobile responsive.

39. The method of claim 28, further comprising said steps of:
determining a src attribute of said iframe,
querying a database for a Client ID associated with said src attribute, receiving a resulting page from said database containing a Cascading Style Sheets (CSS) URL,
wherein said CSS URL is associated with said Client ID of said src attribute, and
transmitting said CSS URL to said user interface,
wherein said user interface transmits said CSS URL to said database and receives CSS styles from said database,
modifying said i-document of said iframe based on said CSS styles.

* * * * *